US012590902B2

(12) United States Patent
Tsai et al.

(10) Patent No.: US 12,590,902 B2
(45) Date of Patent: Mar. 31, 2026

(54) HIGH CLARITY GEMSTONE FACET AND INTERNAL IMAGING ANALYSIS

(71) Applicant: Gemological Institute of America, Inc. (GIA), Carlsbad, CA (US)

(72) Inventors: Tsung-Han Tsai, Maywood, NJ (US); Hiroshi Takahashi, Morristown, NJ (US); Mehdi Toosi, Clifton, NJ (US); Yong Liu, Edison, NJ (US)

(73) Assignee: Gemological Institute of America, Inc. (GIA), Carlsbad, CA (US)

( * ) Notice: Subject to any disclaimer, the term of this patent is extended or adjusted under 35 U.S.C. 154(b) by 164 days.

(21) Appl. No.: 18/372,026

(22) Filed: Sep. 22, 2023

(65) Prior Publication Data

US 2024/0102937 A1 Mar. 28, 2024

Related U.S. Application Data

(60) Provisional application No. 63/409,696, filed on Sep. 23, 2022.

(51) Int. Cl.
G01N 21/88 (2006.01)
G01N 21/958 (2006.01)
(Continued)

(52) U.S. Cl.
CPC ..... G01N 21/8806 (2013.01); G01N 21/8851 (2013.01); G01N 21/958 (2013.01);
(Continued)

(58) Field of Classification Search
CPC ... G01N 2021/8812; G01N 2021/8822; G01N 2021/8867; G01N 21/8806;
(Continued)

(56) References Cited

U.S. PATENT DOCUMENTS

2012/0297826 A1 11/2012 Husar et al.
2014/0063485 A1 3/2014 Palmieri et al.
(Continued)

FOREIGN PATENT DOCUMENTS

CA 2779795 A1 * 5/2011 ............. G01N 21/87

OTHER PUBLICATIONS

International Preliminary Report on Patentability for International Application No. PCT/US2023/033551, dated Apr. 3, 2025, 10 Pages.

(Continued)

*Primary Examiner* — Tri T Ton
(74) *Attorney, Agent, or Firm* — DLA PIPER LLP (US); Blake W. Jackson; Thomas J. Fuller

(57) ABSTRACT

Systems and methods here may be used for a setup of image capturing of a gemstone, such as a diamonds that are of high clarity grades. The present embodiments can provide methods to capture a diamond surface and internal clarity features from a diamond table and through and of other facets. Systems and methods may be used to convert gemstone dimension information into azimuth, slope, and distance information and adjust the motorized stage accordingly for surface imaging. Further, a calibration method can consider the offsets between design and actual system alignment. A calibration process can be used to compensate the offsets. Further, an additional conversion can be derived to compensate the offset caused by the geometry of the gemstone. The methods can automatically capture surface reflection images on facets of the gemstone and internal features taken through facets of the gemstone.

11 Claims, 25 Drawing Sheets

(51) Int. Cl.
    *G06T 7/00*        (2017.01)
    *H04N 23/95*     (2023.01)

(52) U.S. Cl.
    CPC ........... *G06T 7/0002* (2013.01); *H04N 23/95*
        (2023.01); *G01N 2021/8812* (2013.01); *G01N*
           *2021/8822* (2013.01); *G01N 2021/8867*
        (2013.01); *G01N 2201/0633* (2013.01); *G01N*
           *2201/0634* (2013.01); *G01N 2201/105*
        (2013.01); *G01N 2201/126* (2013.01); *G01N*
                *2201/127* (2013.01)

(58) Field of Classification Search
    CPC ............. G01N 21/8851; G01N 21/958; G01N
           2201/0633; G01N 2201/0634; G01N
           2201/105; G01N 2201/126; G01N
           2201/127; G01N 21/87; G06T 7/0002;
           H04N 23/95; C08F 220/14; C08F 8/14;
             C08J 2333/04; C08J 5/18; C08K
           2003/2241; C08K 2201/011; C08K 3/013;
           C08K 3/10; C08K 3/22; C08K 3/30;
           C08K 5/09; C08K 5/372; C08K 5/3725;
           C08K 9/04; C08L 101/00; H10K 59/38;
                         H10K 85/10
    See application file for complete search history.

(56)            References Cited

U.S. PATENT DOCUMENTS

| | | |
|---|---|---|
| 2016/0139058 A1 | 5/2016 | Patel |
| 2019/0037980 A1 | 2/2019 | Maltezos et al. |
| 2021/0129286 A1 | 5/2021 | Sivovolenko |
| 2022/0042925 A1 | 2/2022 | Cheng et al. |

OTHER PUBLICATIONS

International Search Report and Written Opinion for Application No. PCT/US2023/33551, mailed on Jan. 22, 2024, 15 pages.

* cited by examiner

200

1. Surface clarity features

Table

Other facets

Scratch on pavilion

Scratch on table

Feather on pavilion

2. Internal clarity features

Table side internal clarity features

Pavilion/girdle side internal clarity features : bottom view

Pavilion/girdle side internal clarity features : pavilion view + dark field light pinpoint

PP

INS

Reflection pair features

Feathers all around Girdle

2X

1X

CISGO2, 1.78X
7*22 (px) * 1.9 um
**13*43 um**
V=0.67

▽ Switch to dark field light

Schneider 4.0/45, ~2X
5*20 (px) * 3.45 um /2
**8.5*30 um**
V=0.33

HIGH CLARITY GEMSTONE FACET AND INTERNAL IMAGING ANALYSIS

CROSS REFERENCE TO RELATED APPLICATIONS

This application claims priority to U.S. Provisional Application No. 63/409,696 filed on Sep. 23, 2022, the entirety of which is hereby incorporated by reference.

FIELD

The field includes lighting, image capture and analysis systems and methods for evaluating clarity of a diamond or other gemstone.

BACKGROUND

Many imaging systems may be unable to perform automatic clarity grading to diamond with high clarity grades. Instead, such analysis may be done manually based on visual evaluation. Current clarity grading instruments do not have, for example, a sufficient spatial resolution, proper lighting condition to emphasize small features, a capability to examine the diamond from all facets, a capability to scan the entire diamond sample, and/or a capability to separate surface from internal features. Current clarity grading may only detect diamonds with clarity grades below "VS," which can include approximately 72% of regular diamonds. The current instrument-based clarity grading system may not detect diamonds with high clarity. Visual evaluation is used for clarity grading of diamonds with high clarity grades. The remaining VVS2 (13%), VVS1 (11%), IF (3%), and Flawless (<1%) diamonds are generally unable to be consistently graded. Systems and methods here address these shortcomings to image and grade high clarity diamonds and other gemstones.

SUMMARY

Systems and methods here may be used to provide a method to analyze high clarity gemstones in an easily reproducible arrangement and produces reliable results.

Systems and methods here may include, by a computer in communication with at least one light source and a digital camera, causing illumination a sample diamond table with diffused light, by the computer, causing the digital camera to capture surface images of the diamond table under the diffused light, by the computer, causing illumination of the sample diamond facets, other than the table, with collimated light, by the computer, causing the digital camera to capture surface images of the diamond facets, other than the table under the collimated light, by the computer, causing illumination of the sample diamond table with dark field illumination, by the computer, causing the digital camera to capture internal images of the diamond table at a plurality of focal depths under the dark field illumination, by the computer, causing the digital camera to capture internal images of the diamond facets through a pavilion or crown, other than the table, at a plurality of focal depths under the dark field illumination. Systems and methods additionally or alternatively may include, by the computer, analyzing the captured surface digital images of the diamond table and surface digital images of the diamond facets other than the table, to detect anomalies. Systems and methods additionally or alternatively may include, by the computer, analyzing the captured internal digital images of the diamond table and internal digital images through the diamond facets surfaces other than the table, to detect anomalies. Systems and methods additionally or alternatively may include by the computer, assigning a clarity grade to the sample diamond based on the analyzed surface digital images of the diamond table, surface digital images of the diamond facets other than the table, internal digital images of the diamond table, and internal digital images of the diamond facets other than the table. Systems and methods additionally or alternatively may include where the plurality of internal images is taken at focal scanning steps of 0.3 mm to match depth of field for the camera. Systems and methods additionally or alternatively may include where the captured digital camera images of the surface of the diamond facets, other than the table under collimated light include capturing images at 16 different azimuth angles. The systems are methods additionally or alternatively include where the captured digital camera images of the surface of the diamond facts other than the table under collumated light include all other surface images. The systems and methods may additionally or alternatively include captured digital camera images of the internal images include 96 internal images with a focal scanning step for example but not limited to 0.25 mm or 0.3 mm. The methods and systems may additionally or alternatively include analysing by the computer, the surface images by localizing surface and surface reaching features from the surface images of each facet using boundary analysis or contrast comparison of pixels within each image, identifying, by the computer, a type of surface and surface reaching features in the images wherein a type includes a feather, pit, scratch, polish lines, surface graining, or burns, classifying, by the computer, a degree of surface and surface reaching features based on the size and the contrast of the surface features by comparing the detected inclusion size and contrast to a threshold value previously determined, analyzing, by the computer, the internal images by localizing internal and surface reaching internal features from the captured internal digital images from different azimuth angles and depths, identifying, by the computer, a type of internal and surface reaching internal features, wherein a type includes a feather, pinpoint, cloud, or internal graining, differentiating, by the computer, internal inclusions using the surface analysing, classifying, by the computer, a degree of internal and surface reaching internal features based on size and contrast of the internal features using pixel counting and contrast, generating, by the computer, a clarity grade using the surface and internal analyses.

Additionally or alternatively, systems and methods here may include capturing images on a gemstone to determine clarity grade, obtaining, by a computer in communication with a digital camera, a wireframe model of the gemstone, wherein the gemstone is on a stage, by the computer, using the wireframe model to calculate an azimuth angle ($\varphi$), slope angle ($\theta$), and distance (d) from the camera to each facet of the gemstone, by the computer, sending commands to a stage motor configured to rotate the stage, a slope motor configured to adjust slope of the camera to the stage, and a focus adjustment motor configured to adjust focus of the camera to the stage, and to send commands to the camera and a light source, in order to illuminate the stage and gemstone and sequentially capture images of each facet on the gemstone, by the computer, adjusting the slope motor to move the camera to approximately 45 degree angle from a first facet and causing a dark field light source to illuminate the gemstone and capturing dark field images from each gemstone facet.

Additionally or alternatively, systems and methods here may include a computer with a processor and a memory, in communication with at least one light source and a digital camera, the computer configured to cause illumination of a sample diamond table with diffused light, wherein the sample diamond is configured on a stage, causing the digital camera to capture surface images of the diamond table under the diffused light, cause illumination of the sample diamond facets, other than the table, with collimated light, cause the digital camera to capture surface images of the diamond facets, other than the table under the collimated light, cause illumination of the sample diamond table with dark field illumination, cause the digital camera to capture internal images of the diamond table at a plurality of focal depths under the dark field illumination, and cause the digital camera to capture internal images of the diamond facets, other than the table, at a plurality of focal depths under the dark field illumination. Additionally or alternatively, the system further includes a stage motor configured to rotate the stage, a slope motor configured to adjust slope of the digital camera to the stage, and a focus adjustment motor configured to adjust focus of the digital camera to the stage. Additionally or alternatively, the system further includes a back silhouette light source and a silhouette camera configured to capture a plurality of digital silhouette images of the sample gemstone on the rotating stage. Additionally or alternatively, the computer is further configured to analyze the surface images by localizing surface and surface reaching features from the surface images of each facet using boundary analysis or contrast comparison of pixels within each image, identify a type of surface and surface reaching features in the images wherein a type includes a feather, pit, scratch, polish lines, surface graining, or burns, classify a degree of surface and surface reaching features based on the size and the contrast of the surface features by comparing the detected inclusion size and contrast to a threshold value previously determined, analyze the internal images by localizing internal and surface reaching internal features from the captured internal digital images from different azimuth angles and depths, identify a type of internal and surface reaching internal features, wherein a type includes a feather, pinpoint, cloud, or internal graining, differentiate internal inclusions using the surface analysis, classify a degree of internal and surface reaching internal features based on size and contrast of the internal features using pixel counting and contrast, and generate a clarity grade using the surface and internal analyses.

BRIEF DESCRIPTIONS OF THE DRAWINGS

For a better understanding of the embodiments described in this application, reference should be made to the Detailed Description below, in conjunction with the following drawings in which like reference numerals refer to corresponding parts throughout the figures.

DETAILED DESCRIPTION

Figure 1A:
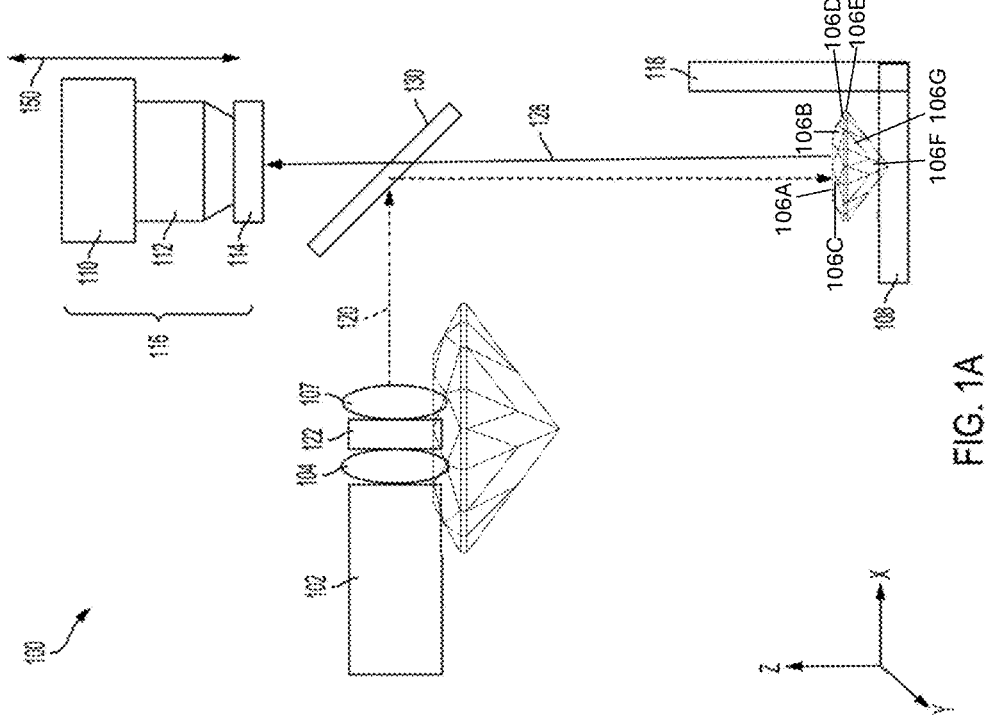
FIGS. 1A-1B show example hardware setup of the equipment which may be utilized to employ the methods described herein.

Reference will now be made in detail to embodiments, examples of which are illustrated in the accompanying drawings. In the following detailed description, numerous specific details are set forth in order to provide a sufficient understanding of the subject matter presented herein. But it will be apparent to one of ordinary skill in the art that the subject matter may be practiced without these specific details. Moreover, the particular embodiments described herein are provided by way of example and should not be used to limit the scope of the particular embodiments. In other instances, well-known data structures, timing protocols, software operations, procedures, and components have not been described in detail so as not to unnecessarily obscure aspects of the embodiments herein.

Overview

In some examples, a diamond with a high clarity grade means the diamond stone only contains clarity features, such as inclusion or surface scratches, that are undetectable by unaided human vision. Due to the rarity of high clarity diamonds, their commercial value is much higher than other diamonds with lower clarity grades. The current protocol for evaluation of a diamond with high clarity relies on a human gemologist visual observation with the aid of a loupe (10× magnifier) and gemological microscope. The gemologist may first use the loupe to detect the clarity features and then use the microscope to identify the type of clarity features with their eyesight. Each sample may need to be examined from all facets, and the clarity features can be recorded by the gemologist by hand.

The evaluation process for high clarity diamonds can be very time consuming, and the result may not be consistent. To be considered as a clarity feature, the feature may need to be detectable under a 10× loupe, but this detection can be subjective and depending on a human grader vision capabilities. These clarity features usually are small in size and shallow in depth. The majority of these clarity features can be difficult to be detected from the table side of the gemstone. Further, these features can appear anywhere on or in a gemstone such as a diamond.

No automated or computerized clarity grading instrument had sufficient spatial resolution, proper lighting condition to emphasize small features, a capability to examine the diamond from all facets, a capability to scan the entire diamond sample, and/or a capability to separate surface from internal features. For instance, current and older automatic clarity grading can only detect diamond with clarity grade below "VS", approximately 72% of regular diamonds. The remaining VVS2 (13%), VVS1 (11%), IF (3%), and Flawless (<1%) diamonds may not be able to be consistently graded.

The systems and methods here account for these deficiencies and provide such automated and computerized imaging and evaluation. Such imaging systems described herein can be built to automatically detect small clarity feature(s) on or in a gemstone such as a diamond. The imaging system described herein can automatically scan the entire gemstone or diamond to detect clarity features, and based on the result, provide a clarity grade to the sample. The entire process, including the evaluation, decision making, and recording can be automated, and the imaging system can provide a more consistent grading result than human grading.

The systems and methods described herein can be used to automate the diamond or gemstone grading process as well as improve accuracy and consistency in grading the diamonds or gemstones. The imaging systems and methods here can detect diamond internal and surface clarity features, for example but not limited down to 3 micrometers (um) in size or smaller. The imaging systems and methods here can also evaluate a diamond internal and surface clarity features from all facets (e.g., table, crown facets, pavilion facets, and girdle (facets)). The imaging systems and methods here can also evaluate diamond clarity features from surface to deep inside the diamond. The imaging systems and methods here can also separate and distinguish clarity feature location among internal feature, surface reaching internal features, and surface features. The result from the imaging systems and methods here can be summarized to provide a final clarity grade. In some instances, the result can identify the type of clarity features or locate the type of clarity features from a diamond 3D reconstruction volume.

Imaging systems and methods described can combine multiple imaging system to capture diamond fine surface and internal clarity features. The imaging systems and methods here can also be used to determine the required imaging system and lighting environment for fine clarity features. The imaging systems and methods here can also determine the required sample adjustment or orientation to capture diamond fine clarity features. The systems and methods here can automatically detect diamond fine clarity features, collect required clarity feature images for clarity grading, and identify diamond clarity features based on the collected data to determine a clarity grade for each analyzed diamond or gemstone.

Surface Feature and Internal Feature Examples

The two main areas of analysis for high clarity gemstones are surface features and internal features. For high clarity gemstones, older methods and hardware setups may miss either or both surface features and internal features that may affect the overall clarity grade.

Surface features may be imaged using specular reflection using diffused light for a table of the gemstone. In some examples, to find surface features on other facets, specular reflection using collimated light may be used.

In some examples, internal features may be found using focus scanning and dark filed light for imaging from the orientation of table and other facets.

Improved internal features imaging may be useful for capturing images of pinpoint sized features for example about 3 microns in size. In some examples, features smaller or larger than 3 microns may be imaged using the systems and methods described herein.

Hardware Setup Examples

A hardware setup for an imaging system is described here and shown for example in FIG. 1. Surface features may be imaged using specular reflection using diffused light for a table of the gemstone and specular reflection using collimated light for other facets. FIG. 1 shows an example hardware setup 100 of the equipment which may be utilized to employ the methods described herein. Such a hardware setup may be useful for imaging gemstones as it may include automatic tilt and focus adjustment, 1.78× magnification for imaging inclusions down to 3 microns, specular reflection for surface analysis, automatic focal scanning from table to culet. In some examples, the focal scanning step may be 0.3 mm. Internal features may be imaged using focal scanning with dark field light.

In the example, many multiple component parts may be included into one overall unit. This unit may include both camera arrangements 116, light source arrangements 102, a gemstone stage 108 and the corresponding lenses as described herein. In some examples, optical components (e.g., 104, 122 and 107) can include lenses that can include any of plano-convex aspheric, double convex, or concave-convex lenses. In some examples, any of the optical components (e.g., 104, 122 and 107) can include collimators to collimate light or diffusers to diffuse light, such as a glass diffuser with 120, 220, 600 or 1500 grit, for instance. In some examples, the light source 118 is a dark field like light source. Internal features may be imaged using focal scanning with dark field light. In some examples, the camera arrangement 116 is a digital image camera capable of capturing digital images that generate pixelated image data for analysis by the camera or other computer as described herein.

In the example of FIG. 1, the gemstone 108 is table side oriented to the camera 116 arrangement so the camera can focus on the table side facet. This arrangement is not intended to be limiting and could include any orientation of the camera to gemstone as described in FIG. 2A or throughout the description.

The hardware shown and described in FIG. 1 may have component parts in communication with a computer such as that described in FIG. 8 but not shown in FIG. 1. In this way, a single system may be able to adjust and command image capture, lighting, light timing, and image capture timing as described herein to more efficiently capture images of gemstones 106 under various lighting conditions that may be useful in analyzing the high clarity gemstones 106 as described herein. In the example, a table side up diamond 106 is shown, with the gemstone 106 table facet facing the camera 116. In one example, the gemstone 106 can include a table facet 106A and one or more facets, such as bezel facet 106B, star facet 106C, upper half facet 106D, girdle facet 106E, pavilion facet 106F, and lower half facet 106G.

As shown in FIG. 1, the focal point for the emitted beams 120, is the gemstone(s) 106 arranged in/on the stage 108. The operator may simply place any number of sample gemstones 106 in holders or on the stage 108 for analysis, or they may be loaded automatically by robotic arm or other methods. The system may then move the table stage 108 and/or the rest of the system 100 to view the gemstones 106 that may be arranged on or in the stage 108 for analysis. In some examples, stage 108 is a translation stage with the capability of three-dimensional, X, Y, Z movement, and/or rotational movement using any of various motors either controlled manually or in communication with a computing system as described herein. The arrangement in FIG. 1 may allow for quick and easy analysis of many multiple samples and greatly simplifies the process for the operator, who otherwise would have to load a new gemstone 106 for analysis one at a time, of each different stone sample. FIG. 1 shows only one gemstone 106 under analysis as an example. In other examples, an entire array of gemstones may be configured and one gemstone at a time may be analyzed by the system by moving the stage 108 with motors as described, to algin the camera 116 and light 102 with one gemstone 106 to analyze at a time.

In order to guide the excitation wavelength to homogeneously illuminate the sample gemstone 106, a beam splitter 130, may be used in some examples. In such examples, the beam splitter 130 may be a 90T/10R beam splitter. One advantage of using a beam splitter in the system described here is that the overall system may be more compact than if such an arrangement were not used. The use of the beam splitter allows for the inbound light beam(s) 120, to illuminate the gemstone stage 108 and the reflected light 128 from the gemstone stage 108 and gemstone under review 106 to pass through the same component part 130 and to the image capture camera assembly 116, which minimizes the amount of space that such an arrangement takes up on a laboratory workspace. Further, the arrangement eases the use by the operator who can manipulate, carry, maneuver, and/or rearrange a compact system more easily than a spread out one.

In the example, a camera 110 and imaging lens 112 are arranged such that they are aimed at the stage 108. In the example, the camera 110 is also aimed through the beam splitter 130. In various examples, the imaging lens 112 may be a fixed magnification imaging lens, a macro lens (for less distortion), a telecentric lens (for long working distance), a manually or motorized adjustable magnification imaging lens (for changing field of view). The imaging lens may also include manual or motorized focusing (like a digital single-lens reflex camera, DSLR).

Internal features may be imaged using focal scanning with dark field light. In some examples, an adjustable aperture 114 is arranged in front of the imaging lens 112. In examples, the adjustable camera lens 112 is capable of magnification such as but not limited to, 1.87× magnification. Such magnification may improve spatial resolution. In some examples, a Z axis scan may be used to image multiple focal depths in the gemstone. In some examples, the focal scanning step is 0.3 mm. In some examples, the focal scanning step is 0.2 mm. In some examples, the focal scanning depth is 0.4 mm. Any scanning step may be used and these are only non-limiting examples.

In some examples, the Z axis scan may extend the sensing range of the system. Such a Z axis scan may be accomplished using physical movement of the stage 108 in the Z direction. In some examples, such a Z axis scan may be accomplished using different focal depths of the camera 110 and lens 112 arrangement.

Such a camera arrangement 116 may be housed in a single housing or structure with the other arrangements described herein. In some examples, this camera arrangement 116 may be adjustable to adjust focal length, it may be fixed, or removable from the overall system 100. In some examples, the camera arrangement 116 may be positioned to view a stage 108 platform, table, holder, or other gemstone 106 support to capture images of a gemstone under review 106.

In some examples, the stage 108 may include a prearranged area to which the camera 116 field-of-view is set. In this pre-arranged area on the stage 108, the samples 106 for analysis may be placed, thereby being included in the camera 116 field-of-view.

In some examples, the camera arrangement 116 may be positioned such that the field of view includes the gemstone 106 stage 108 through a beam splitter 130. In some examples, two beam splitters 130, may be arranged in sequence, such that the camera arrangement 116 is positioned so the field of view is through both beam splitters 130, and then the stage 108. Any number of beam splitters each with their own light source, such as but not limited to one, two, three (not shown), four (not shown), five (not shown), six (not shown), or more may be similarly arranged. Such an arrangement may allow for the camera 116 to view the stage 108 and thereby any gemstones placed on or in the stage 108, through any number of beam splitters which may reflect different wavelengths of light toward the stage 108 from different light sources similar to depicted light source 102 as described herein.

A beam splitter 130, may be used to reflect certain bands of light wavelengths and allow other bands of light wavelengths to pass. In such examples, the beam splitters may be arranged to reflect light from an equal number of light sources 102. In such examples, light 120, from the respective light sources 102, may be generated and beams directed to reflect off the beam splitter 130, and toward the gemstone 106 stage 108. In such a way, light from the different light sources may be reflected toward the stage 108 and thereby excite and/or illuminate any gemstones 106 on the stage 108. In such an example, the excited and/or reflected light 128 may travel back through the beam splitter 130, and to the camera 116 for image capture.

The beam splitter(s), 130 may have different absorption coefficients for light polarized in different directions and may be used to selectively pass light of a small range of wavelengths while reflecting others. In some examples, the first splitter 130 may guide the longwave UV light to the sample, which reflect wavelengths below 395 nm and pass wavelengths above 400 nm. In such examples, an average reflection ratio may be around 100:1, which may be enough to guide the excitation and relays the luminescence signal. In some examples, this reflected light may be between 400-700 nm in wavelength. Since the excited light from the gemstone 106, may be of a particular wavelength (between 400 nm-700 nm) it may pass through the beam splitter(s), 130 instead of reflecting off it as the original deep UV beam 120, did.

In some examples, the beam splitter 130, may reflect light with wavelengths less than 300 nm and allow light with wavelengths greater than 300 nm to pass. In some examples, the excitation wavelength is between 10 nm and 400 nm.

In some examples, the first light source 102 may be an ultraviolet (UV) light emitting diode (LED) light source. A UV LED light source, an LED light source, and a Xenon flash lamp, and/or laser with wavelengths between 350 and 410 nm may be used. The example of a UV LED and a Xenon flash lamp are merely non-limiting examples. Other kinds of light sources may be arranged, in any number, and in any order, with corresponding beam splitters. In some examples, the light source 102 is a laser driven light source (LDLS). In some examples, the light source 102 may be a deuterium lamp. In some examples, the light source 102 may be a 224.3 nm HeAg laser.

In some examples, a computer system is in communication with the light systems as described. In such examples, the computer may control timing of energizing, or turning the light sources 102 either on or off to direct different combinations of light at different times toward the stage 108 and thereby illuminate and/or excite the gemstones 106 which may be placed there. The camera 116 may then capture the excited or reflected light 128 from the gemstones 106 which travels back through the two beam splitters, 130 toward the camera lens 112 and the image capturing camera 110.

No matter how many separate beams of light are directed toward the gemstone 106 stage 108, they may excite and/or reflect 128 and travel back up through the beam splitter, 130 of however many are arranged and through the adjustable aperture 114 if there is one, camera lens 112 and image capture camera 110.

Further, in some examples, LED light panels 118 may be arranged to surround, or otherwise aim at the stage 108 to illuminate the gemstones 106 from different angles. In some examples, surrounding light source 118 may be white light LED, which may cover from 400 nm to 700 nm wavelength. In some examples, the light source 118 is a dark field light source. In some examples, such light source 118 has a color temperature of the white light LED between 2,800K to 6,500 K, and in some examples, 5,000K. The Color Rendering Index (CRI) value could be from 80 to 98. In some examples, white LED with CRI>90 may be used.

This camera 110 may then digitally receive and/or capture the excited and/or reflected image of the gemstone(s) 106 for analysis as described herein. In combination with the multiple light sources sequentially illuminating the gemstone 106 and stage 108, the camera imaging system 110 may collect/capture corresponding images such as but not limited to a white light image, a longwave fluorescence image, a shortwave fluorescence image, and/or a phosphorescence image by automatically controlling the light sources 102 and timing the image capture. In some examples, multiple image capture may occur corresponding to any of the various light source illumination, and image capture timing may be set to corresponding illumination. Representative color and brightness may be calculated from any fluorescence and phosphorescence captured images as described herein.

In some examples, the camera arrangement 116 may include a Z adjustment mechanism 150. Such a mechanism may be or include motors, bearings, rails, rollers, screws, pulleys, gears, levers, or any other kind of machine either manual or motor driven that is capable of moving the camera assembly 116 up and down in relation to the gemstone stage 108. In some examples, the stage 108 may be moved relative to the camera assembly 116. In some examples, both the camera 116 and stage 108 may be moved relative to one another.

Such an image may include color pixelated data representing the gemstone fluorescence image as described herein. The camera 110 may include computer components, for example as described in FIG. 7 and FIG. 8 and may also be in communication with other computer components as described herein for timing the camera image capture, processing the pixelated digital images, for saving, storing, sending, and/or otherwise analyzing or manipulating the pixelated digital images of the gemstone tables.

Figure 1B:
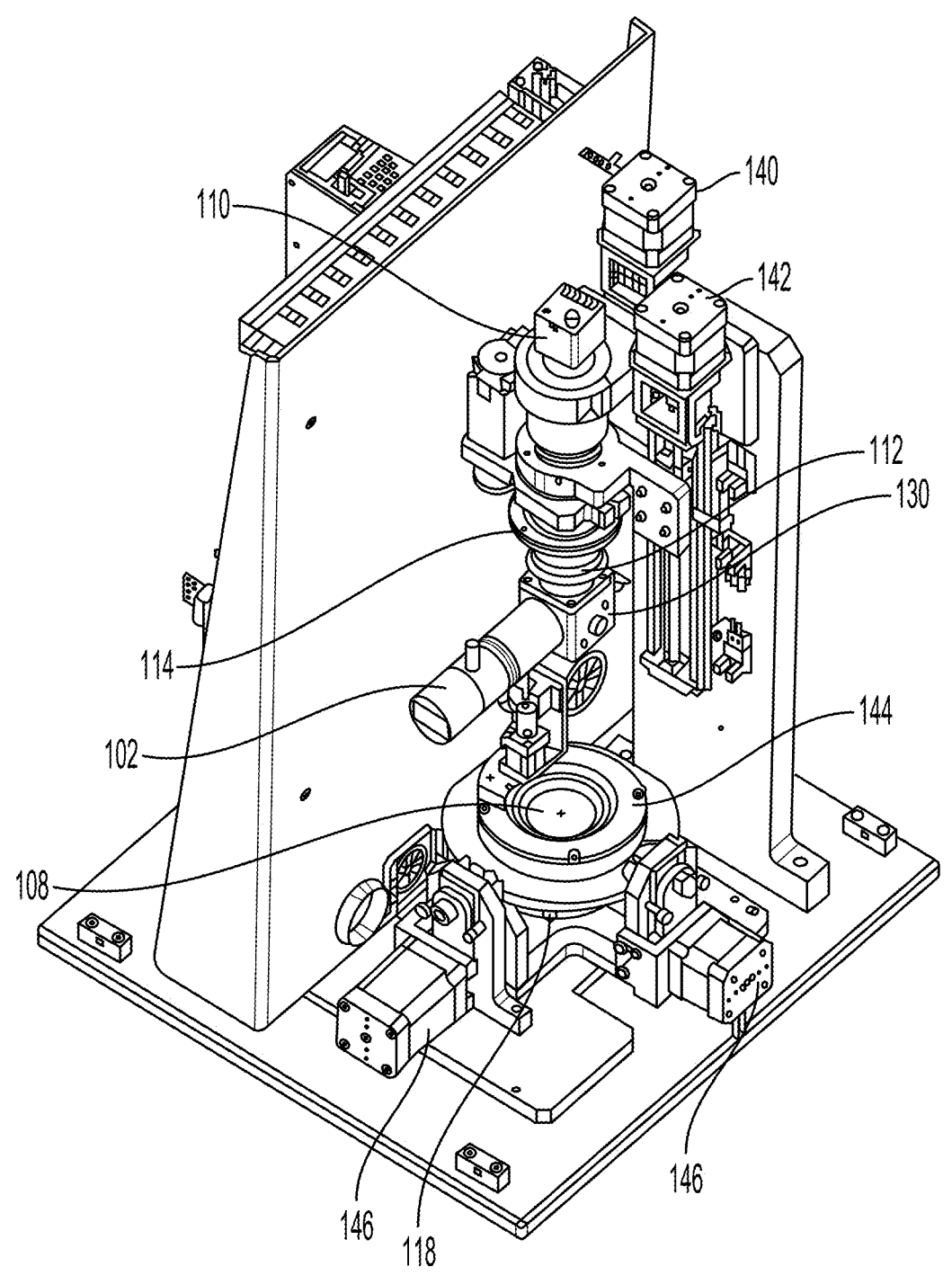

FIG. 1B shows another example of FIG. 1A with more detail. FIG. 1B includes the camera 110, the motorized aperture 114, side light source 102, stage or sample holder 108 dark field light source 118, imaging lens 112, beam splitter 130 for example, 90T/10R beam splitter or other beam splitter. And FIG. 1B also shows the Z axis motorized stage 140, the motorized stage for magnification control 142, motorized irises 144, and the motorized gimbal stages 146. FIGS. 1A and 1B are meant to depict hardware components that may be used in any combination or permutation as described herein.

Azimuth Examples

Side viewing may be used to acquire a wireframe model of a sample gemstone, capture surface images of every facet, and use a plurality of different azimuth angles to do so, for example, 16 different azimuth angles. Such methods may be used to capture a plurality of surfaces images, for example but not limited to 56 surface images and a plurality of internal images for example but not limited to 96 internal images with a focal scanning step for example but not limited to 0.25 mm or 0.3 mm.

In some instances, the hardware setup can include camera mounts and gemstone mounts that allow for image taking of any of an Azimuth angle ($\varphi$), slope angle ($\theta$), and distance (d) information of each facet from the camera. This may be done by the computer sending commands to each of the motors to move or rotate the cameras as well as turn the stage as described herein. The wireframe information can be read to adjust the orientation and the surface measurement. Surface measurements may include surface reaching clarity features and surface polishing features. Surface features may be imaged using specular reflection using diffused light for a table of the gemstone and specular reflection using collimated light for other facets. In some examples, the camera may be moved to about a 45 degree angle to the facet and the dark field illumination may be utilized to measure the scattering images inclusions as the camera views through the facets. Such steps may include to focus on the surface of the gemstone, select 16 azimuth angles (8 pavilion main and 8 between each pair of lower girdle), at each azimuth angle, capture 6 images from the surface to internal with 0.25 mm scanning step, and scanning step matches the depth of field of the lens. Then in some examples, move the camera to other slope angles to acquire internal images from the table.

In some embodiments, the hardware setup can include a pavilion side internal analysis setup. The systems and methods may be used to (a) rotate and scan the sample with different depth(s), (b) provide a ~2× magnification to resolve ~3 um pinpoints and clouds, (c) use a dark field light or diffused back light, (d) where slope angles could be 20 to 50 for pavilion side imaging and close to 0 for girdle side imaging, (e) and wherein the dark field light can improve the visibility of small features like cloud and pinpoints but may not be able to show internal graining. In some examples, back light may be used to image graining in or on a gemstone. Internal features may be imaged using focal scanning with dark field light.

Figure 2A:
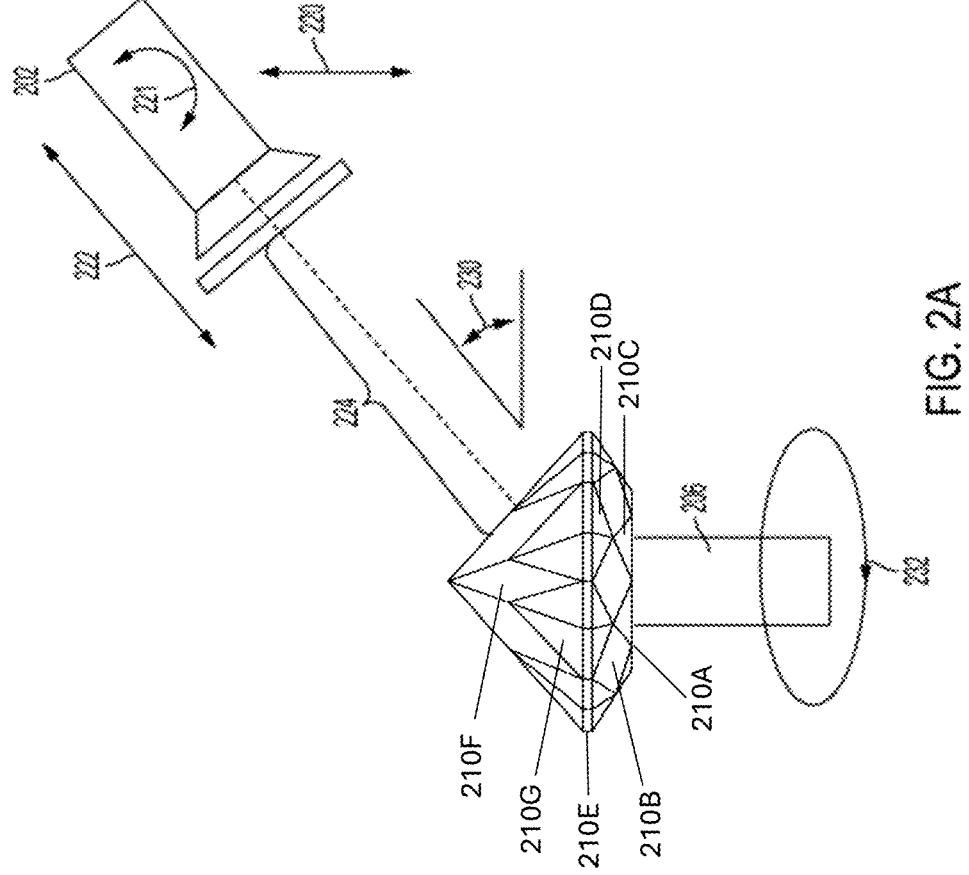
FIG. 2A is a side view of an example azimuth imaging camera and gemstone on the stage in accordance with certain aspects described herein.

FIG. 2A is a side view of an example surface imaging camera 202 and gemstone 210 on the stage 206. In the example setup of FIG. 2A, the focal plane of the camera 202 is adjusted to be perpendicular or nearly perpendicular to a particular facet angle on the sample stone 210. As described, various motors and hardware structures may be used to adjust the various angles and positions of the camera 202 in relation to the stone 210 to capture multiple images of the gemstone 210. It should be noted that a light source in some examples, may move with the camera 202 adjustments as described. In an example, the gemstone 210 can include a table facet 210A and a number of facets, such as bezel facet 210B, star facet 210C, upper half facet 210D, girdle facet 210E, pavilion facet 210F, and lower half facet 210G.

Figure 12:
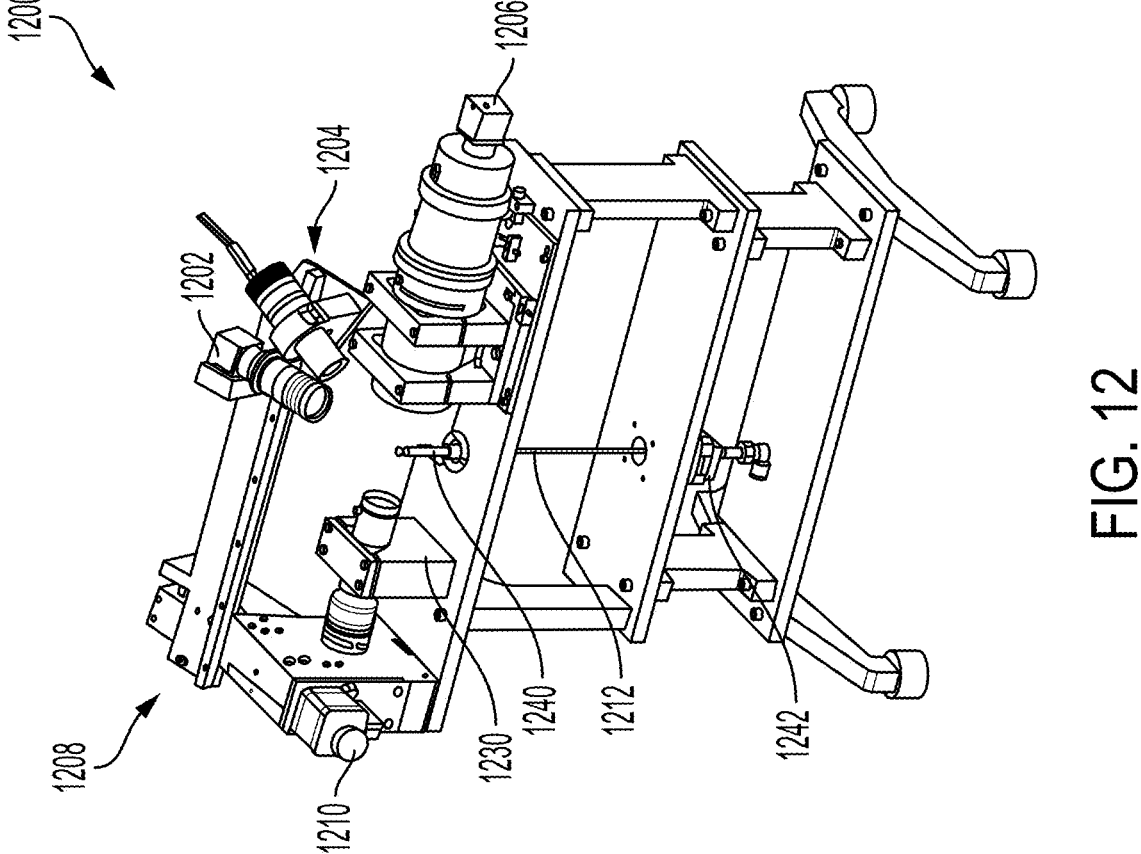
FIG. 12 is an example hardware setup of a system to capture gemstone dimension information and convert the gemstone dimension information into azimuth, slope, and distance information and adjust the motorized stage accordingly for surface imaging in accordance with certain aspects described herein.

FIG. 12 later describes more complex hardware arrangements which may be used to capture images as described more simply in FIG. 2A. The two explanations alone or in combination describe both the simple theoretical and more practical elements of the systems and methods described herein for polar coordinate lighting and image capture.

Figure 2B:
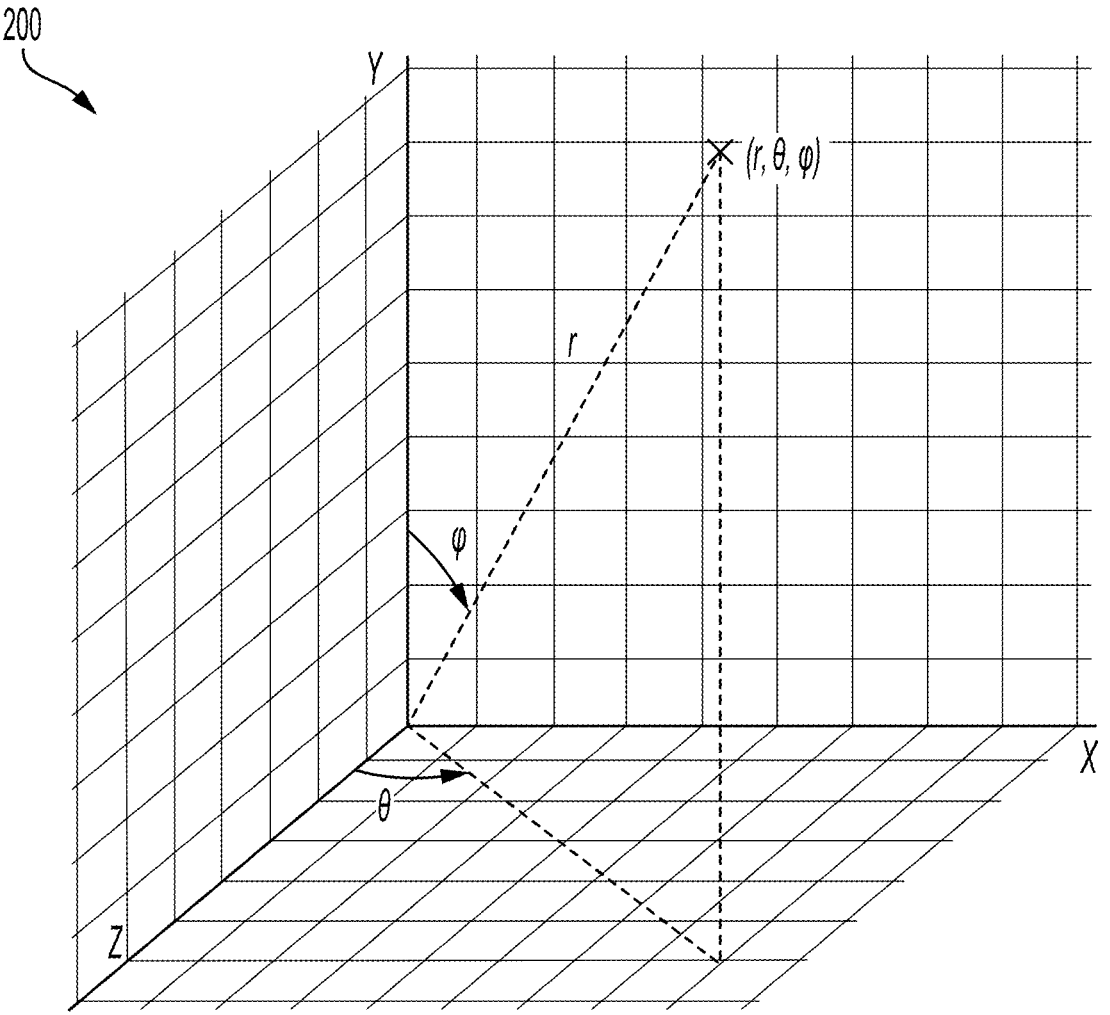
FIG. 2B is an example diagram illustrating dimension measurement output in accordance with certain aspects described herein.

The output from dimension measurement can include stone center coordinates and stone facet information. Example stone facet information can include rho, theta, phi, which can be relative to the stone center coordinates. FIG. 2B is an example diagram 200 illustrating dimension measurement output. As shown in FIG. 2B, the coordinate planes can determine a rho, theta, and phi using angular measurements captured from the dimension information.

The hardware setups described in FIG. 1 showing a top down angle to capture gemstone table images and FIG. 2A showing a side angle may be used to capture pavilion images and/or crown images of the sample gemstone (110, 210, and 210). The camera 102, 202, 202 and/or light source 124, 204, 204 may be adjusted in three polar coordinates in order to help enhance and image the gemstone facet surfaces as described.

For example, the slope angle $\theta$ 230 in FIG. 2A may be adjusted by moving the camera 202 up and down 220 and/or pivot 221 in relation to the stone 210 to try and obtain an angle perpendicular to the gemstone 210 facet that is being imaged, for example a pavilion facet. The next angle is the azimuth angle $\phi$ 232 in FIG. 2A adjusted by turning or pivoting the stage 206 about a central stage axis to provide each angle of the gemstone 210 to the camera 202 as it is rotated. Another coordinate variable is a distance d, 224 of the camera 202, to the sample gemstone 210 may be changed by moving the camera 202 by motors in and out 222 toward and away from the stone 210 as described.

Figure 21:
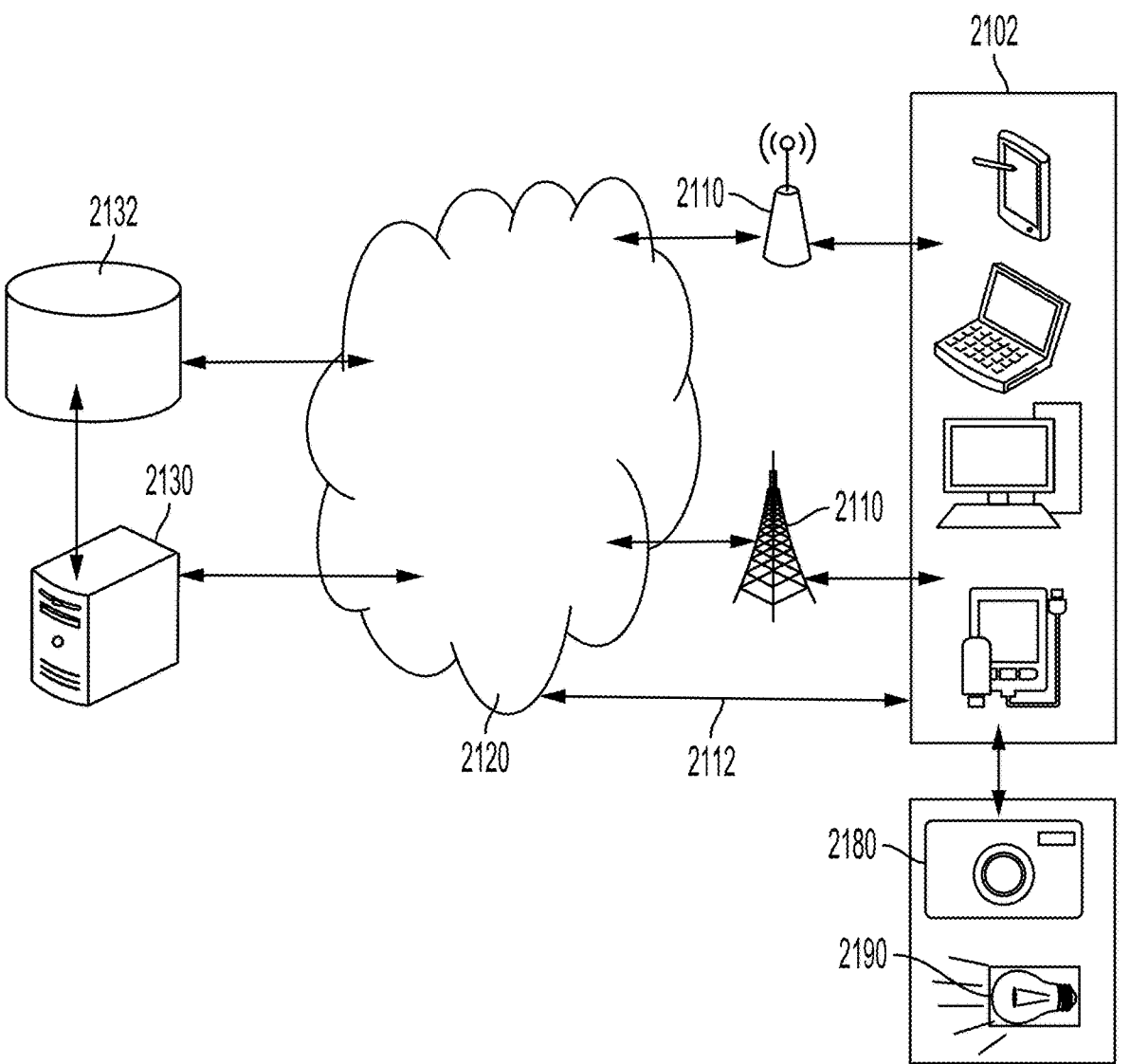
FIG. 21 is an illustration of an example networked system in accordance with certain aspects described herein.
Figure 22:
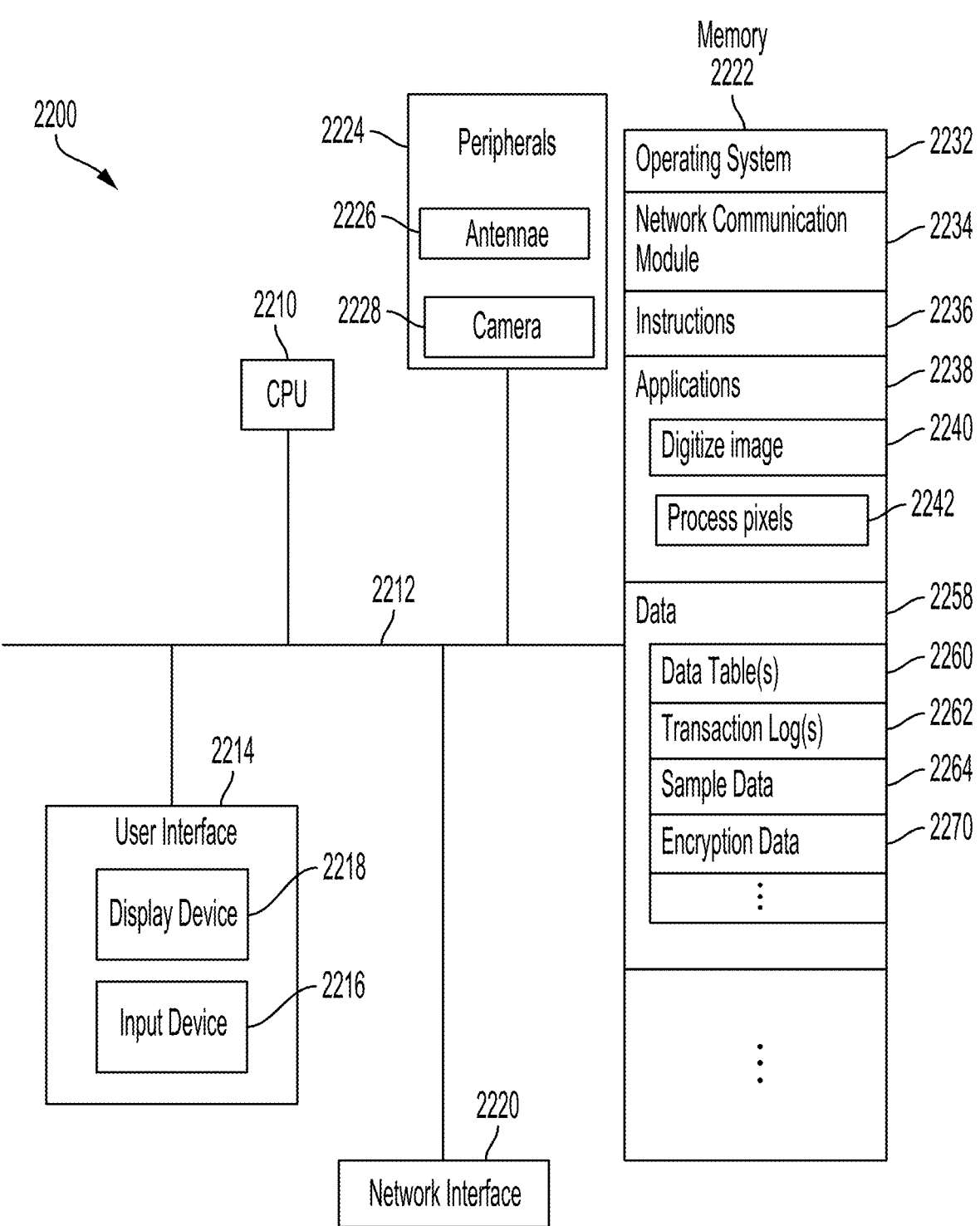
FIG. 22 is an illustration of an example computer system in accordance with certain aspects described herein.

All motors discussed in reference to FIG. 2A may be in communication with a computer system such as those described in FIG. 21 and FIG. 22. By communicating with the motors, cameras and lights, the computer systems may be able to control using software commands, the movement of the motors, image capture, light capture, timing of any of these, as well as metadata capture such as time, position of motors, light settings, or other parameters useful in analysis of the gemstone. Such information may be stored or cause to be stored by the computer in order to further analyze or retain records regarding the gemstones under analysis as described herein.

As shown in the example setup of FIG. 2A, to aid in the analysis of each captured image, the parameters and/or coordinates of the hardware setup may be acquired, correlated, and stored with each corresponding captured image. Such information may include but is not limited to camera slope angle $\theta$ 230, azimuth angle $\phi$ 232 and a distance d, 224 of the camera 202, to the sample gemstone 210. Such information may be taken from sensors on the various motors used to rotate the stage 206, move the camera 202 out and in 222, up and down 220 and/or tilt 221 the camera 202. This information may allow for comparison of hardware setup for various images taken under different light and camera parameters. As described, in some examples, the stage 206 includes a vacuum assembly and ports to hold a sample 210 to the stage 206 during evaluation. In some examples, this stage 206 is smaller than the table of the gemstone 210 such that it does not obstruct images taken from crown facets or multiple angles.

In some examples, additionally or alternatively to using sensor data on the motors, wireframe data of the mapped facets may be used to determine the various light and camera parameters. For example, once the wireframe data is determined for a gemstone 210, and a distance 232 between the stone 210 and camera 202 is determined, the wire frame data collected and determined for the individual stone 210 may be used to map all the facet faces and junctions of the gemstone. When rotated in an azimuth 232, so the camera 202 may view the different facets, a computer system may be used to determine the viewing angle of the camera for each image.

The alignment of the camera 200 may be along the long axis vertical of the camera. In some examples, the accuracy of angular alignment may be between +/−0.6 degrees for both azimuth and slope. In some examples, the accuracy of angular alignment may be between +/−0.5 degrees azimuth for girdle images. In some examples, an adjustment range of slope may be +90 degrees to −75 degrees and the azimuth a full 360 degrees. Additional offsets may be set to each parameter in order to better reveal minute surface features in the images such as polishing features as described herein.

In such examples, the camera 202 may be mounted to a gimbal or motor arrangement to adjust the slope angle $\theta$ 230 of the camera to the gemstone by computerized instruction. The azimuth angle $\phi$ 232 may be adjusted by a motor turning a stage 206 with the gemstone 210 resting or mounted on it. Computer software may be used to send commands to all motorized stages, lighting, and camera imaging devices to automatically generate angle and distance parameters from side viewing camera or load the information from wireframe data as described herein.

In such examples, three motorized stages for slope angle θ 230, azimuth angle φ 232 and a distance d, 234 of the camera 202 may be adjusted and programmed for movement to allow the system to sequentially capture images of the gemstone 210. In such examples, even automated shutter time control may be used to avoid saturation and maximize contrast in the images.

The mechanisms to adjust and move the cameras and lights in relation to the sample gemstone may be by servo motors attached to gimbals, rods, supports, braces, and other hardware architecture known in the industry. The stage 206, and/or camera 202, and light 204 may rotate relative to one another. Other various small electric motors may be used such as stepper motors, brushless motors, and brush dc motors to move the camera and light in order to change the slope angle θ, azimuth φ and distance, d of the camera to the gemstone as described herein.

Figure 2C:
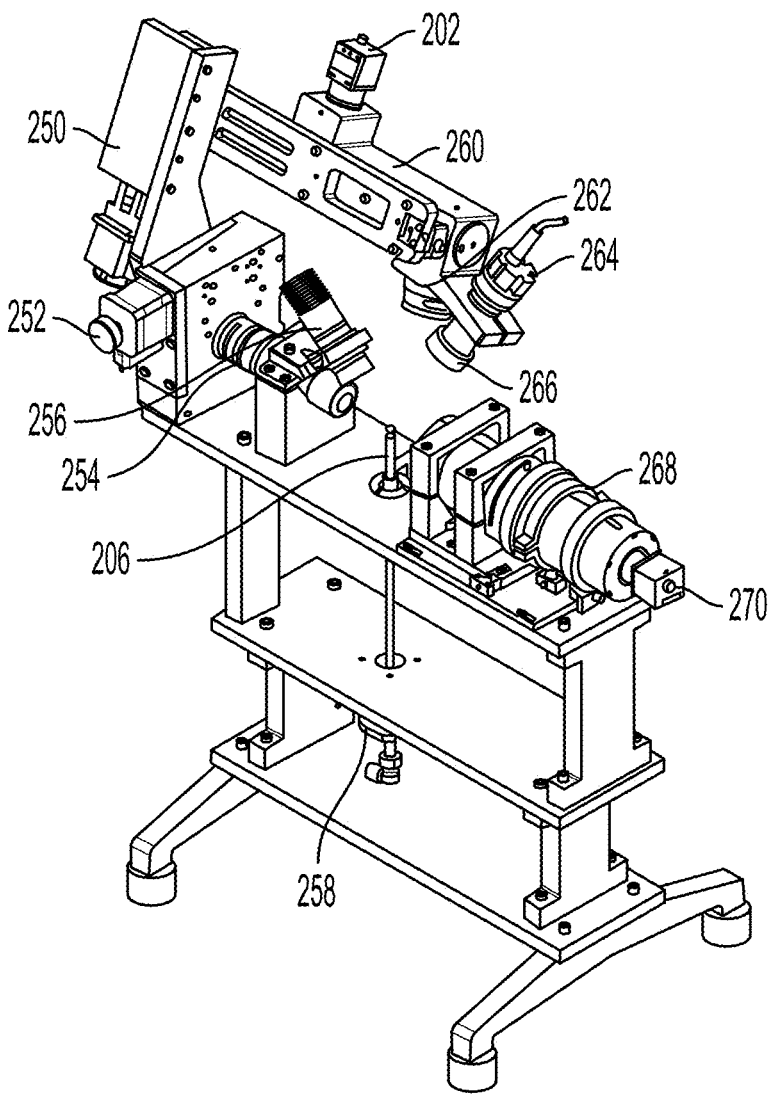
FIG. 2C is a view of an example azimuth imaging camera and gemstone on the stage in accordance with certain aspects described herein.

FIG. 2C shows another example of the azimuth hardware arrangement similar to FIG. 2A. As shown in FIG. 2C, the motor stage for focus adjustment 250, motorized stage for slope adjustment 252, telecentric LED for wireframe 254, dark field LED 256, stage 206, motorized stage for azimuth adjustment 258, camera 202, relay optics including a polarizer 260, imaging lens 262, telecentric LED for surface analysis 264, polarizer 266, telecentric lens for wireframe capture 268, and camera for wireframe capture 270. In the example, the motor stage for focus adjustment 250 allows the camera 202 to move and focus as shown in FIG. 2A, 222. In one example, the stage 206 can be a sample holding nozzle with a vacuum. The motorized stage for slope adjustment 252 may allow for the camera 202 and imaging lens 262 to move as shown in FIG. 2A, 221. The telecentric LED for wireframe 254 may be a light source such as, but not limited to an LED light source to illuminate a sample on the stage 206 for back lighting to obtain silhouette images using the wireframe camera setup 270 and lens 268 where the stage motor 258 turns the stage 206 and thereby any sample thereon through the 360 degrees of rotation to capture images as described herein. As described, the stage 206 may include a suction or vacuum arrangement with a pump (not shown) to vacuum hold a sample on the stage 206 while turning and imaging but be able to easily remove and replace for the next sample. The telecentric LED for surface analysis 264 may include a polarizer 266 to illuminate the sample surface. The dark field illumination arrangement 256 may allow for low angle illumination dark field lighting of a sample on the stage 206 for surface analysis.

It should be noted that all the motors and cameras and light sources described in FIGS. 1A, 1B, 2A and 2C may be in communication with a computer arrangement that is able to send and receive commands and data to and from each motor and/or camera. In such a way, the systems may be automated, that is, run from software executed by the computer and individual computer components with the motors and cameras and lights as described herein.

Image Analysis Examples

FIGS. 3A-3B, 4A-4C, 5A-5B, 6A-6B, 7A-7B, and 8A-8B show various examples of clarity features that may be captured in images using the systems and methods described herein. Such features may be depicted in the images captured using the systems and methods described here and then identified using image pixel analysis by the computer. Such features may also be mapped using the facet information gathered during image capture as described in FIG. 2A.

These identified and mapped clarity features may then be used by the system to determine an overall clarity grade as described.

Figures 3A, 3B:
FIGS. 3A-3B are illustrations of surface clarity features of a diamond in accordance with certain aspects described herein.

FIGS. 3A-3B are illustrations of example surface clarity features of a diamond. As shown in FIGS. 3A-3B, the reflection can include a greatest contrast for shallow surface features. An accurate focus and tilt alignment between the camera and facets can be used to obtain such images of surface reflection for image capture and analysis.

Figures 4A, 4B, 4C:
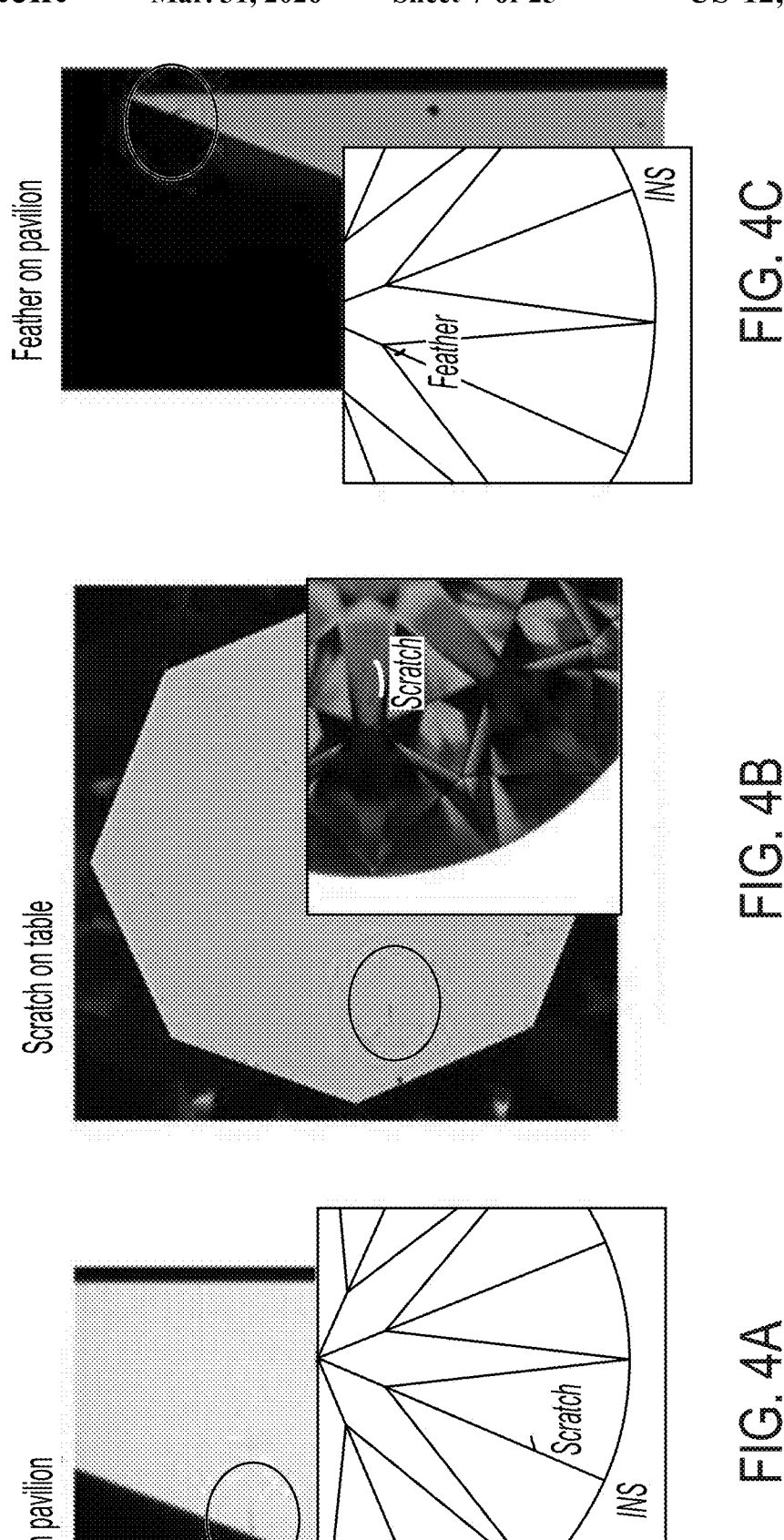
FIGS. 4A-4C illustrate various example surface clarity features in accordance with certain aspects described herein.

FIGS. 4A-4C illustrate various example surface clarity features. For example, FIG. 4A depicts a scratch on a pavilion, FIG. 4B illustrates a scratch on the table, and FIG. 4C illustrates a feather on the pavilion.

Figure 5B:
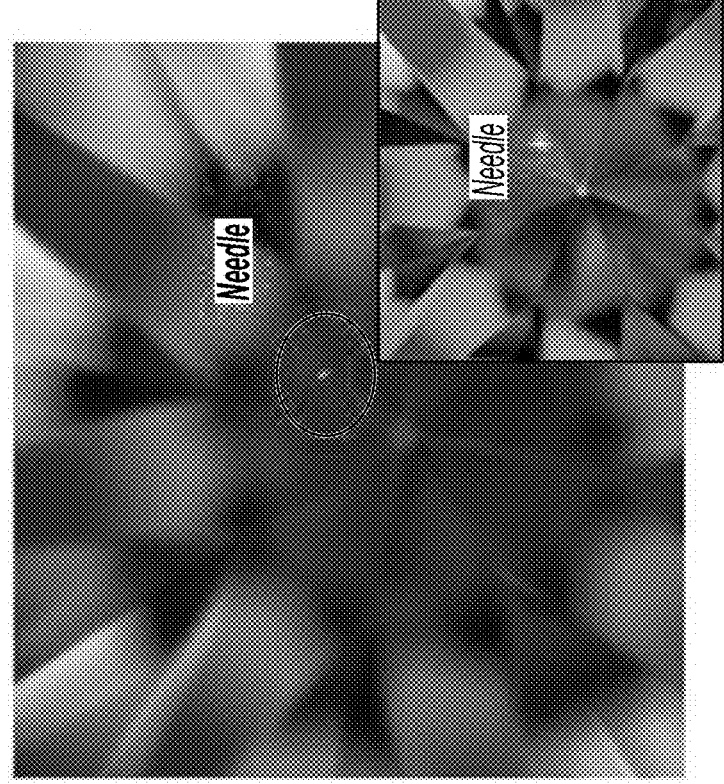
FIGS. 5A-5B illustrate example table side internal clarity features in accordance with certain aspects described herein.
Figure 5A:
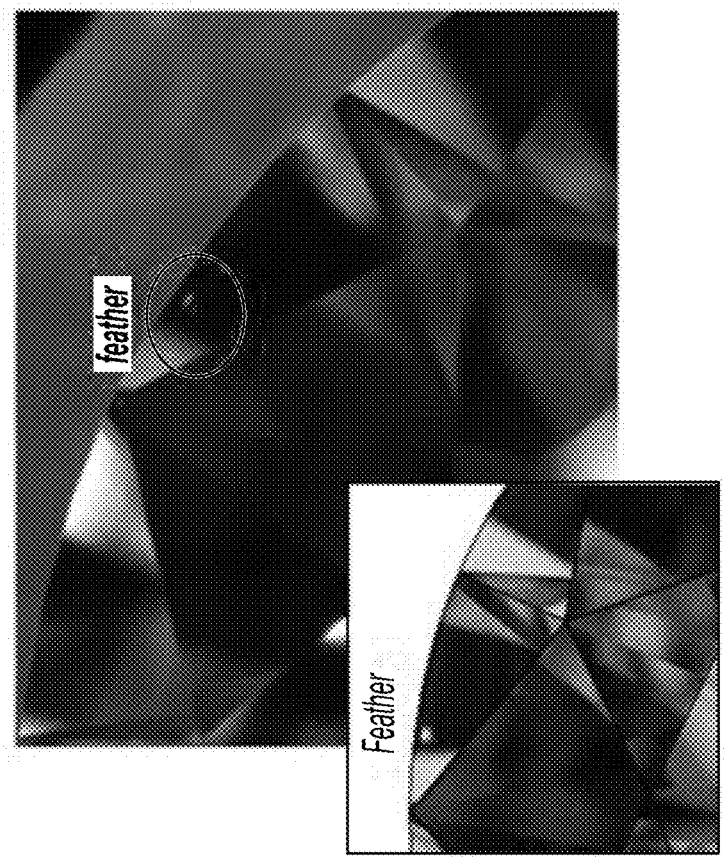

FIGS. 5A-5B illustrate example table side internal clarity features of a gemstone. As shown in FIGS. 5A-5B, a feather (e.g., in FIG. 5A) or a needle (e.g., in FIG. 5B) can include example internal clarity features.

Figure 6B:
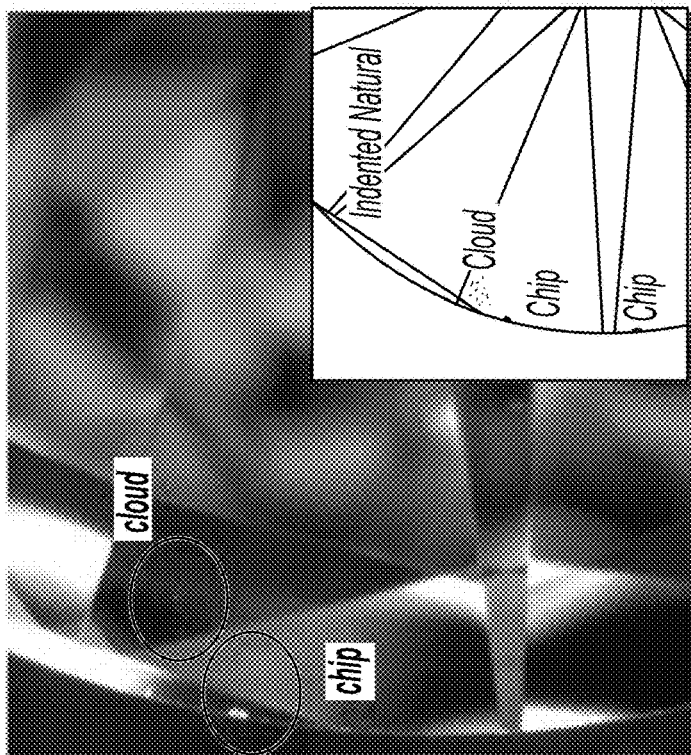
FIGS. 6A-6B illustrate a bottom view of example pavilion/girdle side internal clarity features in accordance with certain aspects described herein.
Figure 6A:
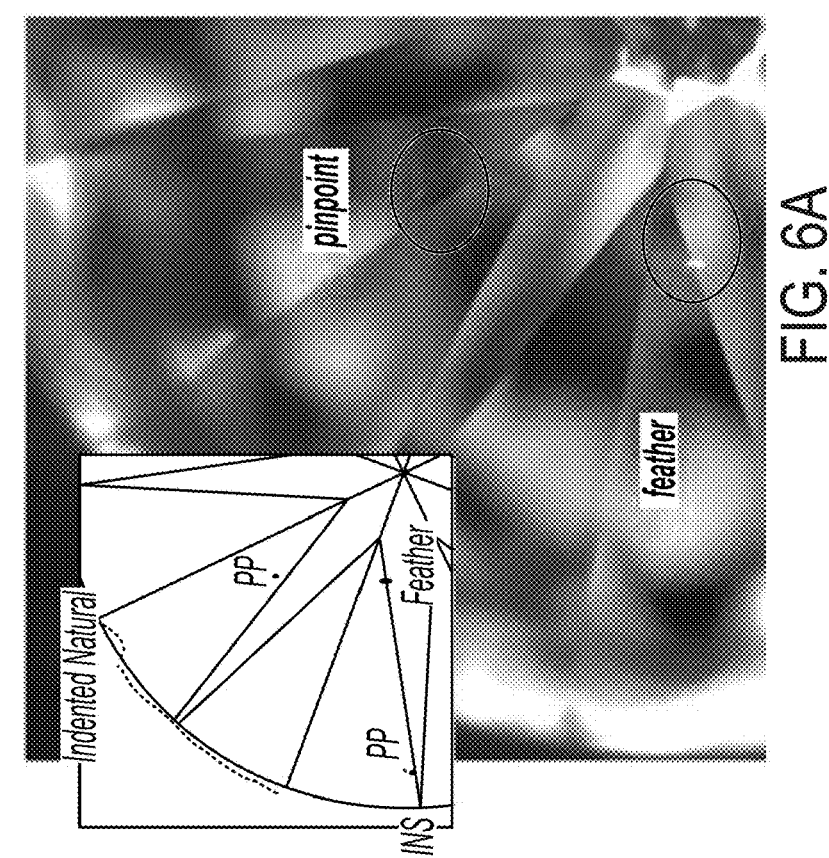

FIGS. 6A-6B illustrate a bottom view of example pavilion/girdle side internal clarity features. As shown in FIGS. 6A-6B, a feather or a pinpoint (e.g., in FIG. 6A) or a chip and/or a cloud (e.g., in FIG. 6B) can include example pavilion/girdle internal clarity features.

Figures 7A, 7B:
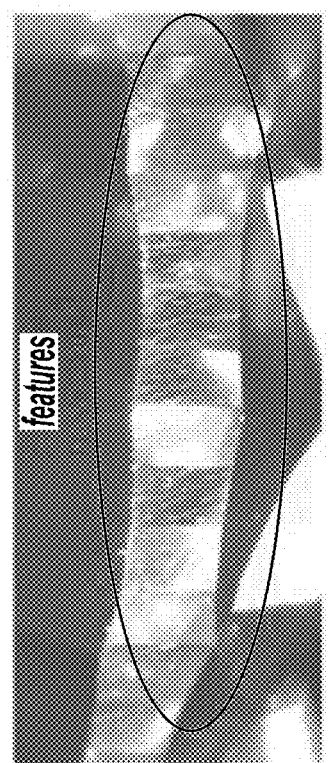
FIGS. 7A-7B illustrate a pavilion view of example pavilion/girdle side internal clarity features with a dark field light in accordance with certain aspects described herein.

FIGS. 7A-7B illustrate a pavilion view of example pavilion/girdle side internal clarity features with a dark field light. As shown in FIGS. 7A-7B, a reflection pair or a pinpoint (e.g., in FIG. 7A) or a feather (e.g., in FIG. 7B) can include example pavilion/girdle side internal clarity features.

Figure 8B:
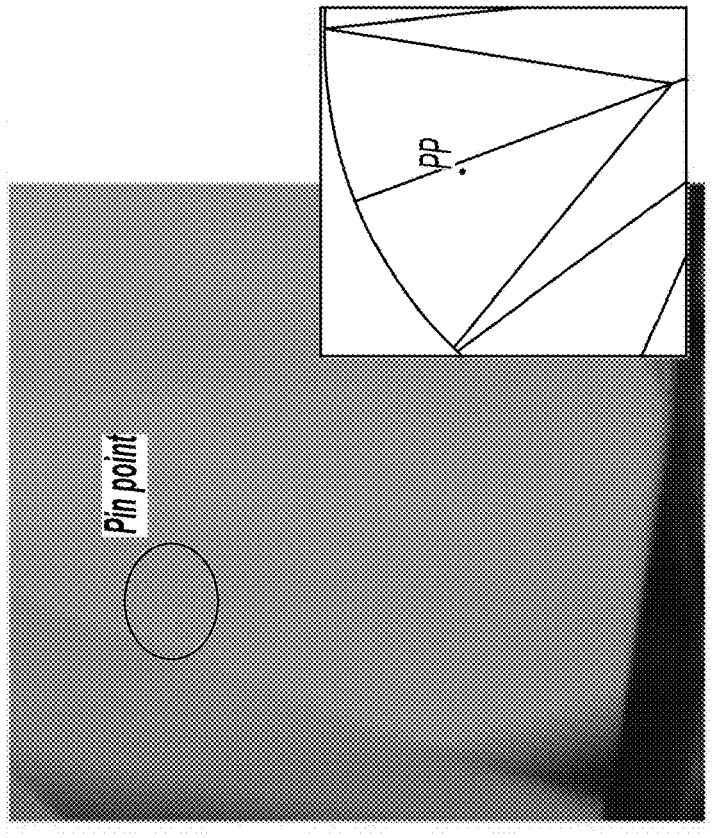
FIGS. 8A-8B illustrate a pavilion view of example pavilion/girdle side internal clarity features with a back light in accordance with certain aspects described herein.
Figure 8A:
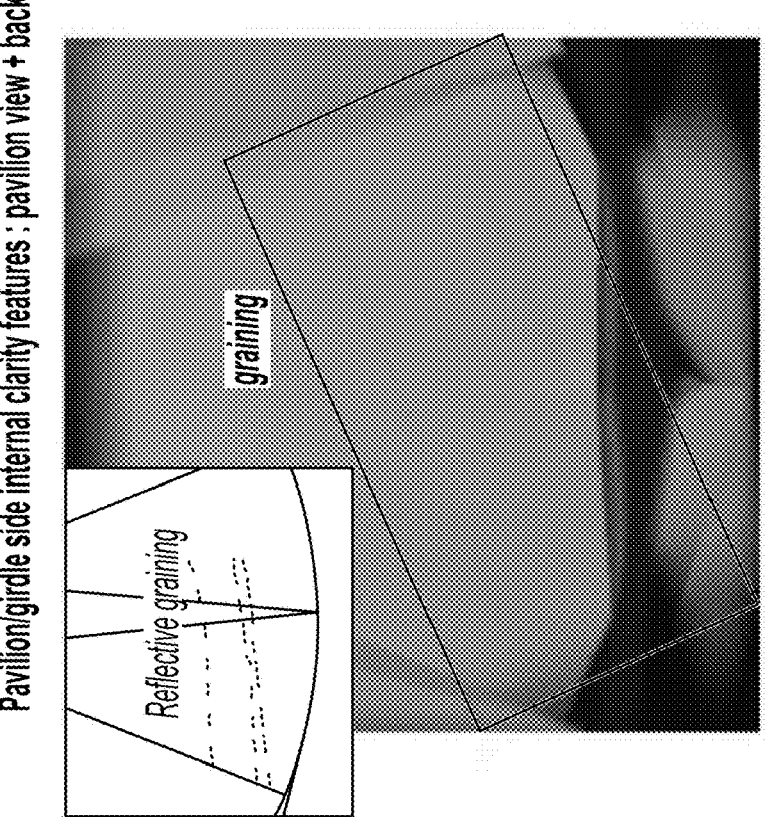

FIGS. 8A-8B illustrate a pavilion view of example pavilion/girdle side internal clarity features with a back light. As shown in FIGS. 8A-8B, graining (e.g., in FIG. 8A) or a pin point (e.g., in FIG. 8B) can include example pavilion/girdle internal clarity features.

Magnification and Dark Field Examples

In some examples, it may be difficult to capture an image of a facet that clearly shows the clarity features. Internal features may be imaged using focal scanning with dark field light. Dark field lights may be used at lower angles of incidence to produce images of dark fields, except for surface abnormalities. Thus, to improve spatial resolution while maintaining enough of field of view, magnification may be used by the systems and methods here to improve the image capture. In some examples, for top viewing environment as shown in FIG. 1, the systems may utilize magnification of approximately 1.87×. In some examples, for side camera as shown in FIGS. 2A and 2B, the systems may use magnification of approximately 2×. In some examples, to use 1.1" sensor to cover 7.07*5.18 Field Of View for 2× side camera and 7.94*5.81 for 1.87× top camera.

Figure 9B:
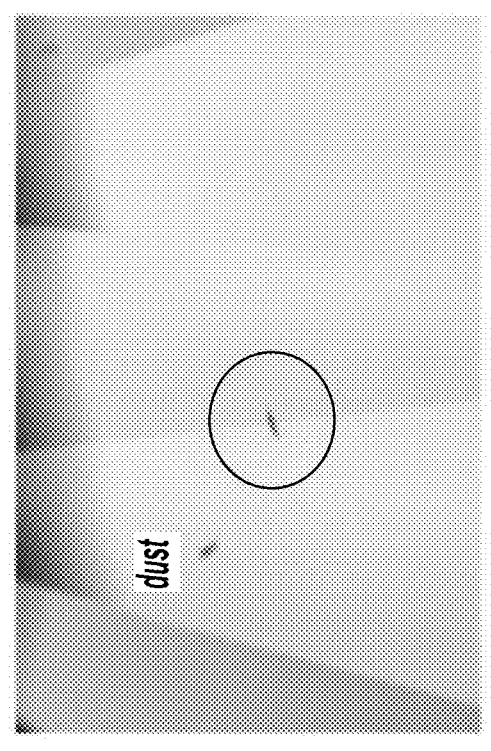
FIGS. 9A-9B illustrate diamonds depicted with an increased lens magnification.
Figure 9A:
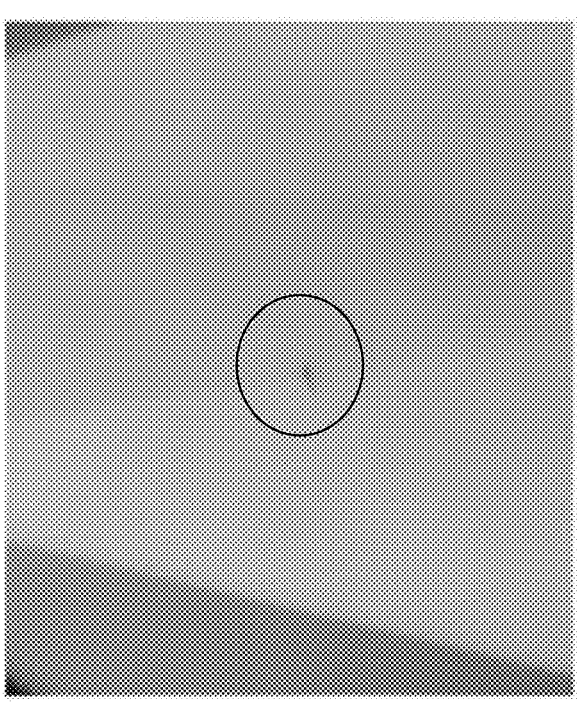

FIGS. 9A-9B illustrate diamonds depicted with an increased lens magnification. For example. This can improve special resolution while maintaining a sufficient field of view.

In some examples, features may be more clearly depicted in captures images if dark filed lighting is used. Such dark field lighting may allow for better visibility of small features in the captured images.

Figure 10B:
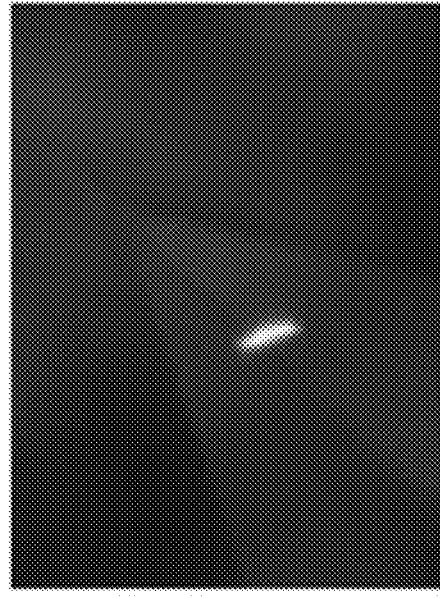
FIGS. 10A-10B illustrate diamonds switched to a dark field light in accordance with certain aspects described herein.
Figure 10A:
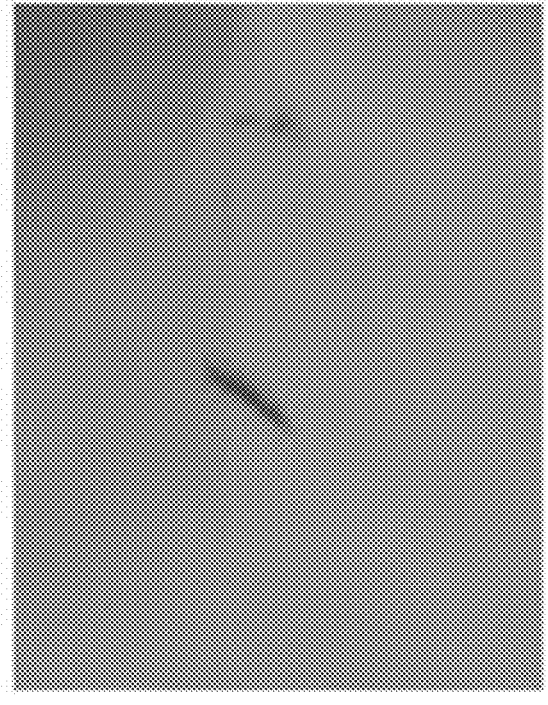

FIGS. 10A-10B illustrate diamonds switched to a dark field light. Dark field light can improve the visibility, it can also slightly enlarge the small clarity features. In some instances, to extend the sensing range, Z axis scanning may be required. Internal features may be imaged using focal scanning with dark field light.

Method Examples

Figure 11:
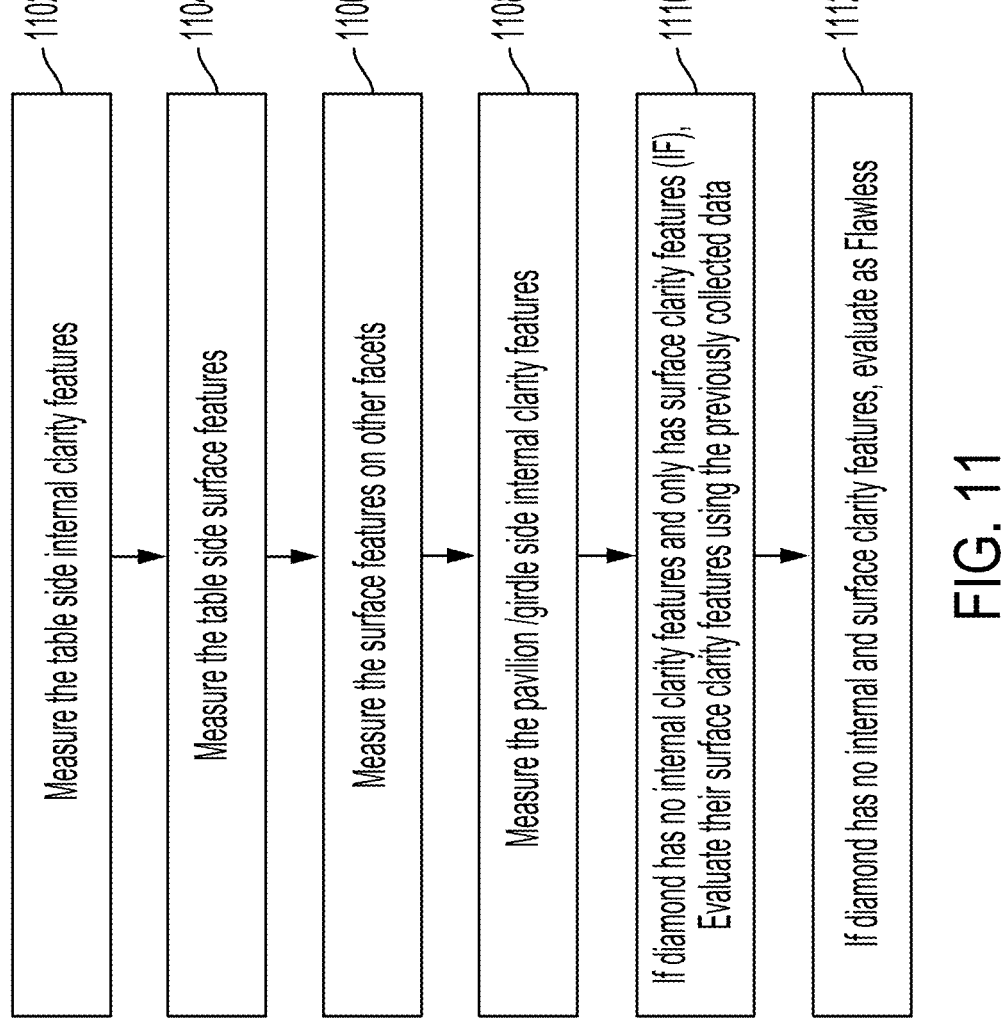
FIG. 11 is an example method for determining a clarity grade for a high clarity diamond in accordance with certain aspects described herein.

As described above, systems and methods here can be used to grade and identify high clarity diamonds, which can include VVS and above, approximately 28% of all diamonds. FIG. 11 describes example method steps for determining a clarity grade for a high clarity diamond using the systems described herein.

At 1102, the method can include measuring the table side internal clarity features (most of the VVS2 and some VVS1). This can be done using high magnification imaging system with Z axis scan as shown in FIG. 1 and accompanying description.

At 1104, the method can include measuring the table side surface features first, and then measuring table side internal features. This can be done using high magnification imaging system with Z axis scan as shown in FIG. 1 and accompanying description.

At 1106, the method can include measuring the surface features on other facets. This can be done using systems shown in FIG. 2A and accompanying description.

At 1108, the method can include measuring the pavilion/girdle side internal clarity features (some VVS1). This can include pavilion imaging with dark field/back light for pavilion/girdle side. This can be done using systems shown in FIG. 2A and accompanying description. In some instances, this may need a higher magnification than a reflection imaging camera. The system can also measure the crown side internal features if necessary.

The analysis of the internal and surface features of these method steps in FIG. 11 may be accomplished by a computer using software that analyzes the captured digital pixelated images of the gemstone facets and any clarity features shown therein. Such image analysis may include boundary analysis, contrast pixel analysis, pixel counting, or any other kind of image analysis of the color or shade or contrast of the pixels to locate, map, and then identify any clarity features. Such software may be catalog any of the identified and/or mapped clarity features and help grade the gemstone clarity.

At 1110, if diamond has no internal clarity features and only has surface clarity features (IF), the method can include evaluating their surface clarity features using the previously collected data.

At 1112, if the diamond has no internal and surface clarity features, the diamond can be evaluated as Flawless by the computer software.

If the diamond does have internal and/or surface clarity features, it may be compared to threshold tables depicting various clarity grading limits to evaluate the diamond accordingly.

Diamond Facet Imaging Automation

As described above for the hardware arrangement of FIG. 2A, and FIG. 12, in many instances, a hardware design for an imaging system can adjust the tilt and focus for consistent gem imaging. However, the sample alignment may not be trivial. The requirement for alignment can be angular for azimuth and slope, and the focusing can be approximately ±0.5° and ±0.2 mm, respectively. In addition, the offset of the sample positioning and system's initial offset can also impact the alignment. In many cases, even with the hardware device to support the angle and focus adjustment, it could take an extended period of time (e.g., of up to 1 hour) to properly focus on every facet on a diamond. To help this, software protocols can be created to automatically focus the camera on every facet.

In some examples, systems and methods here may be used to automatically capture facet images using software protocol(s) that are based on the knowledge of a diamond dimension information, a motorized rotation stage, a motorized tilt stage, and a motorized linear translation stage to properly adjust the azimuth angle, slope angle, and focal distance of the camera to automatically capture all the facet information from a diamond (e.g., except the table facet, which may be blocked by the stage/holder and imaged using a hardware setup such as that shown in FIG. 1). Such hardware is shown in FIG. 2A and described in the accompanying paragraphs herein as well as FIG. 12 with details of robotic arm movement for camera and/or illumination as described in FIGS. 13, 14, 15, 16, 17, 18 and 19. The systems and methods as described herein can include the strategies of system calibration and sample alignment. The collected images can be used in various systems for diamond evaluation, such as the systems as described herein.

The imaging system as described herein can automatically scan an entire diamond to image surface features to provide images for clarity evaluation. The entire process can be automated, and the imaging system can provide a consistent grading result.

For instance, systems and methods here may be used to calculate requirements of adjustments of azimuth and slope rotations and focusing translation to sequentially focus on every diamond facet automatically based on the input information, such as gemstone dimension information. Systems and methods here can be used to compensate any system alignment error(s), such as mismatch in distance or tilt between design and assembling the final hardware setup. Systems and methods here can be used to compensate for any gemstone positioning error, such as the mismatch between the center of the gemstone and the center of the rotation center of the system (on the rotation stage). Systems and methods here can be used to determine the quality of focus of an image based on the feedback from the computer of a captured image used to provide a feedback loop to the camera to adjust focus of the system.

In some examples, systems can use different designs for automation of image capture, lighting, and gemstone rotation. For instance, such designs can include the device spinning and tilting the sample constantly, and using a laser as an illumination light source to shine on the sample gemstone and use a camera to capture the image. During the sample gemstone rotating and tilting, each facet can create specular reflection to the laser spot when the angle between the laser and the camera is the same. Every created specular reflection laser spot can represent one facet on the sample gemstone or diamond. The orientations, such as the angle of rotation stages, of the sample gemstone can be recorded as described herein. The system can adjust the sample gemstone to those angles and focus the camera to capture an image on diamond gemstone surface. In some non-limiting examples, the scanning and focusing can take about 15 minutes for regular round cut diamond with 56 facets plus one table facet.

The present examples can provide methods to convert gemstone dimension information into azimuth, slope, and distance information and adjust the motorized stage accordingly for surface imaging. Further, a calibration method can consider the offsets between design and actual system alignment. A calibration process can be used to compensate the offsets. Further, an additional conversion can be derived to compensate the offset caused by the geometry of the gemstone. The methods can automatically capture the reflection images on diamond's every facets.

The present examples can be used for various applications. For example, the methods as described herein can automatically detect a gemstone surface feature or identify diamond surface polishing or clarity features. Further, the methods as described herein can collect clarity feature images for clarity grading or detect potential surface treatments, such as laser drilling or burn marks created by high pressure high temperatures treatments.

The examples shown in FIG. 12 depict a hardware setup of a system to capture gemstone dimension information and convert the gemstone dimension information into azimuth, slope, and distance information and adjust the motorized stage accordingly for surface imaging. Such an arrangement depicts the practical hardware elements which may be used to capture polar coordinate positioned images similar to the simplified arrangement of FIG. 2A. As shown in FIG. 12, the system 1200 can include any of a side camera 1202, a telecentric LED 1204, a dimension measurement camera 1206, a focus adjustment subsystem 1208, a slope adjustment subsystem 1210, and an Azimuth adjustment subsystem 1212. The stage 1240 upon which a gemstone may rest or be vacuum attached table side down or up may be in communication with or part of the spindle that turns or rotates by an azimuth turning motor 1242. By turning the gemstone stage and thereby the gemstone sample through 360 degrees of azimuth as described herein, the various cameras may capture images of the gemstone facets in turn.

In some examples, a dimension measurement camera 1206 can capture dimensions of a gemstone placed in the system 1200 back lit by the back lighting system 1230. Further, a focus adjustment subsystem 1208 can manipulate a side camera 1202 configured to capture side views of the gemstone and a telecentric LED 1204 to modify a focus of the system 1200 in capturing images of the gemstone. The slope adjustment subsystem 1210 and Azimuth adjustment subsystem 1212 can adjust the system 1200 for capturing Azimuth angle (φ), slope angle (θ), and distance (d) information of each facet of the gemstone. In the example of FIG. 12 the various adjustment components may be moved by motors in communication with one or more computers as described here. In such examples, the computer systems may send commands to move the robotic assemblies about pivot axes to move and adjust the various cameras and/or illumination sources as described herein. For example, the slope adjustment 1210 system may be a motor used to move the arm upon which the side camera 1202 is mounted to adjust the slope angle of the coordinates for image capture as described herein. For example, the azimuth adjustment 1212 may be a motor used to turn the stage upon which the sample gemstone is resting, to change the azimuth angle of the side camera 1202 relative to the gemstone.

The system 1200 in FIG. 12 can capture any of an Azimuth angle (φ), slope angle (θ), and distance (d) information of each facet of a gemstone. Further, the wireframe/ dimension information can be read to adjust the orientation of the gemstone. Further, this information can be used for a surface polishing measurement. For example, a side camera slope orientation can be between +90° to −75°, with an azimuth of around 360°. In some instances, the systems as described herein can implement surface imaging using the camera 202 and gemstone 210 on the stage 206 as described in FIG. 2A.

Image Analysis and Grade Determination

As described, a variety of both surface and internal images may be taken of a sample gemstone using the methods and systems described herein. In examples, the computer systems may analyze these digital images and generate clarity grades based thereon.

For surface analysis, in some examples, this may include data analysis of images of surface features. In such examples, the computer may localize surface and surface reaching features from the specular reflection images of each facet. In some examples, this may be accomplished using boundary analysis or contrast comparison of pixels within each image. In some examples, the computer may then identify a type of surface and surface reaching features in the images. For example, the image may show an anomaly inclusion such as but not limited to a feather, pit, scratch, polish lines, surface graining, burns, or others. Next, the computer may classify the degree of surface and surface reaching features based on the size and the contrast of the features. Such classification may be the computer comparing the detected inclusion size and/or contrast to a threshold value previously determined. In some examples, such classification by the computer may be using a lookup table or chart. In some examples, artificial intelligence may be used to compare the detected inclusions to determine a classification of each.

For internal analysis, in some examples, the computer may localize internal and surface reaching internal features from the captured scattering digital images from different azimuth angles and depths. In such examples, the combination of azimuth and depths can be considered as different viewing angles by the computer to help the localization of features in gemstone. Then the computer may identify a type of internal and surface reaching internal features, such as but not limited to feather, pinpoint, cloud, internal graining or other inclusion type. The computer may then use the information from the surface analysis to differentiate internal only inclusions and other feature, where internal only features do not appear on gemstone surface. The computer may then classify the degree of internal and surface reaching internal features based on the size and the contrast of the features. Such classification may be the computer comparing the detected inclusion size and/or contrast to a threshold value previously determined. In some examples, such classification by the computer may be using a lookup table or chart. In some examples, artificial intelligence may be used to compare the detected inclusions to determine a classification of each.

In some examples, once the classification and number of inclusions in both the surface and internal areas of the gemstone are determined, and that information may be used to generate an overall clarity grade for the gemstone. Again, such analysis may include the computer utilizing a lookup table, a chart comparison, an artificial intelligence analysis, or other diagnostic.

Additionally or alternatively, any inclusion detected by the systems and methods here may be stored for fingerprint type matching. In such examples, the localization and mapping of surface and/or internal inclusions may be stored and compared against later measured gemstones for matching and identification purposes. In some examples, such mapped information may be printed out and displayed for a user. In some examples, a certificate may be generated with the grade and mapped inclusions for an analyzed gemstone.

Camera Axis Calibration

Figure 13:
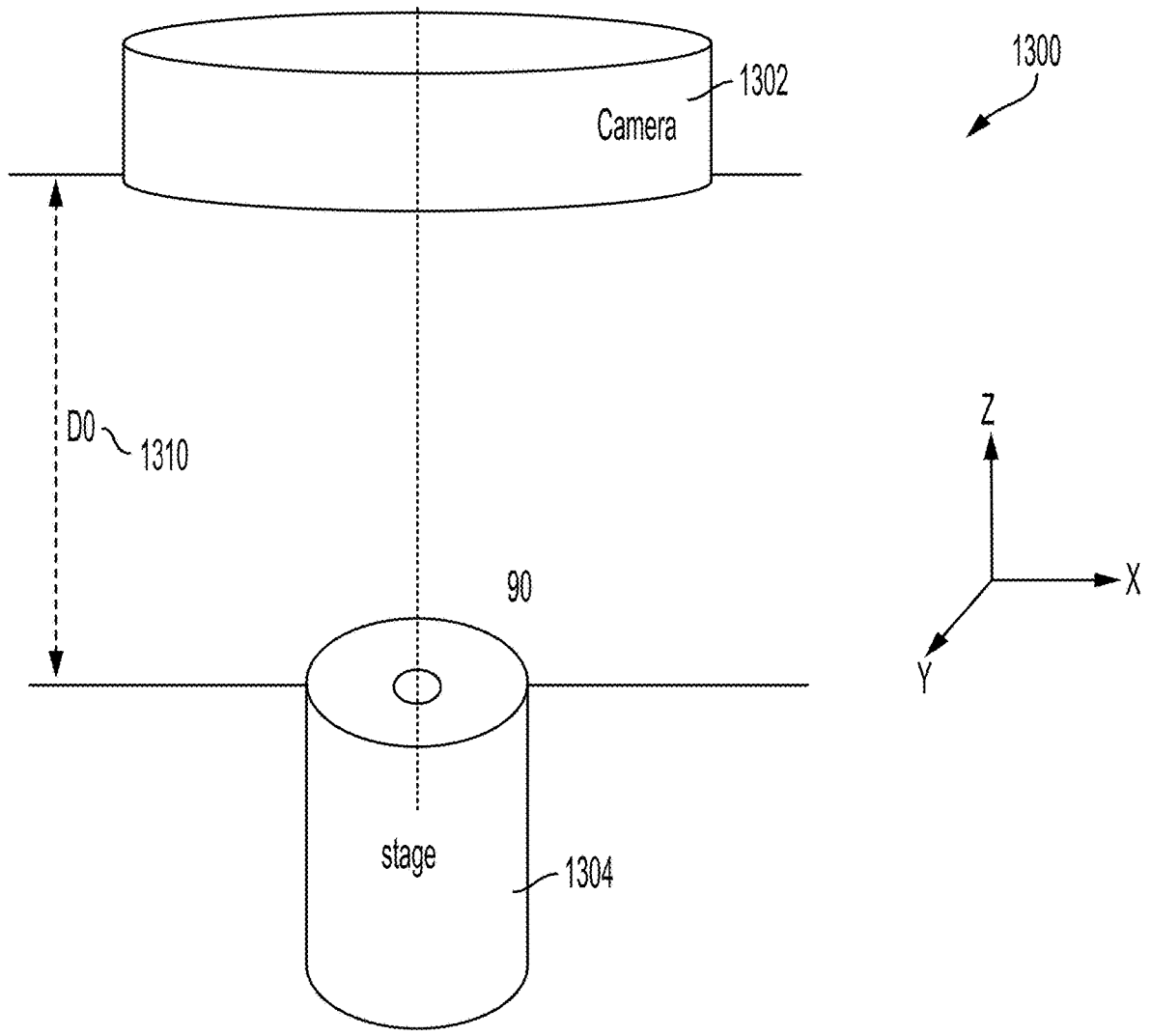
FIG. 13 illustrate example configurations for arm axis calibration in an X direction in accordance with certain aspects described herein.
Figure 14:
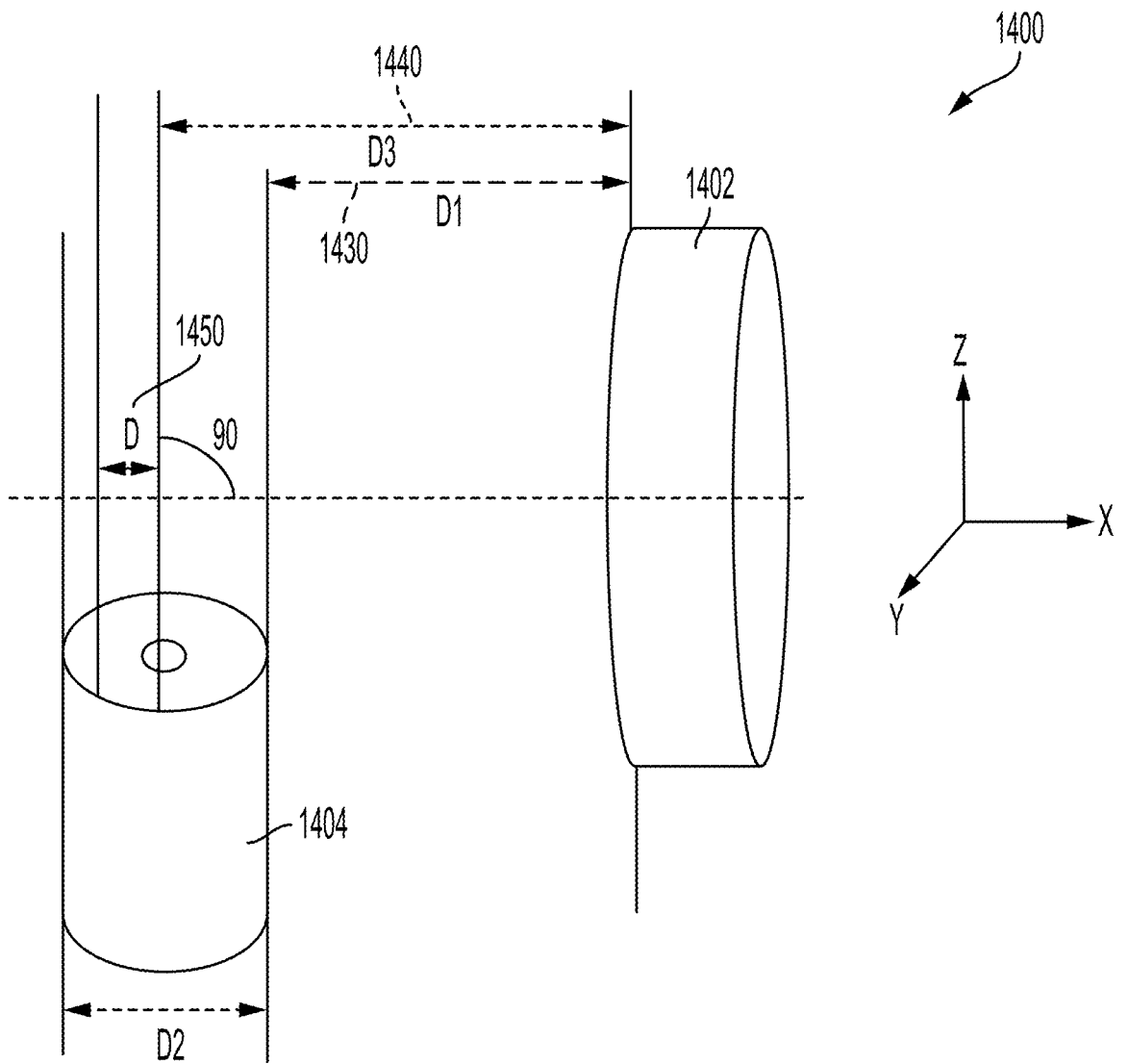
FIG. 14 illustrate example configurations for arm axis calibration in an X direction in accordance with certain aspects described herein.
Figure 15:
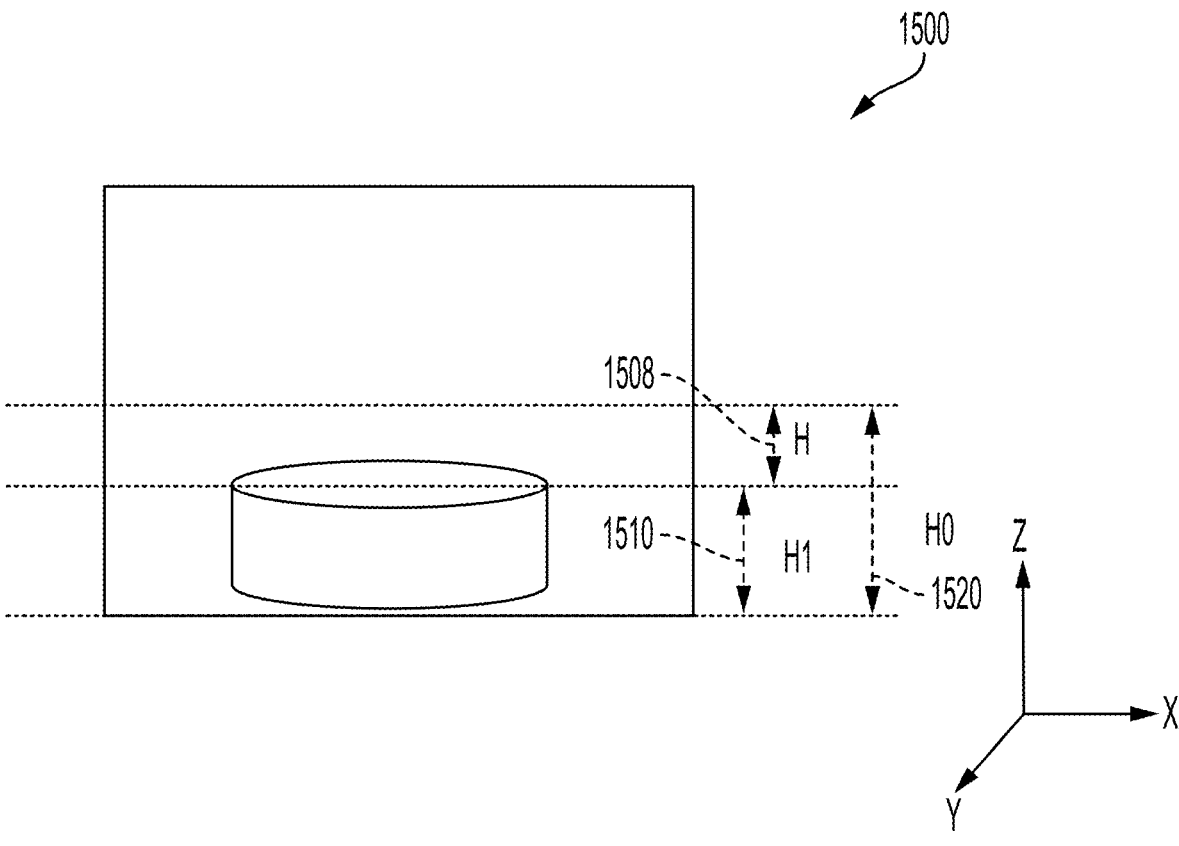
FIG. 15 illustrates an example configuration for arm axis calibration in a Y direction in accordance with certain aspects described herein.

FIGS. 13, 14 and 15 depict various calibration arrangements which may be used by the systems and methods here in order to calibrate the camera angles to capture images of gemstone facets for analysis. Such calibration may be useful in order to maintain accurate facet count and identification as well as improve focus of images. Example calibration may include arm rotation axis such as the center of the slope adjustment relative to the stage rotation center position. The camera and stage arrangements may pertain to any of the setups described here including but not limited to those described in FIG. 1, FIG. 2A and FIG. 12.

FIGS. 13 and 14 illustrate example configurations 1300 and 1400 for arm axis calibration in an X direction. Further, FIG. 15 illustrates an example configuration 1500 for arm axis calibration in a Z direction.

For example, in FIG. 13, a configuration 1300 can include a camera 1302 disposed a distance D0 1310 above a stage 1304. As another example, in FIG. 14, a configuration 1430, the distance D1 between an inner edge of the stage 1404 and camera 1402. Further, a distance D3 1440 can include a distance between a center of the stage 1404 and an inner edge of the camera 1402. The stage 1404 can include a diameter D2 and a radius D 1450.

From the Z direction, as shown in FIG. 15, the configuration 1500 can include a height H 1508 above the stage, a height H1 1510 of the stage, and a height H0 1520 of the stage (H1) and a height above the stage (H).

Each description of moving a camera and/or stage may include sending commands from computers as described herein to motors in communication with the motors in order to move such hardware as described herein. By moving the motors for the camera and/or stage, each hardware component may be moved relative to one another to achieve the desired position as described herein.

As shown in FIG. 13, the arm axis calibration process can include setting the camera 1302 homing position to where the camera viewing axis is perpendicular to the stage 1304 plane. From this position, the distance between the camera to the stage D0 1310 can be measured.

As shown in FIG. 14, the process can also include rotating the camera 1402 about 90 degrees and/or using a second camera position on the side of the stage 1404 and then measuring a distance between the camera to stage rotation center D3 1440 by measuring the distance between the camera to stage edge D1 1430 and the stage diameter D2 or twice the radius D 1450. The camera 1402 can have a fixed focal plane/working distance in such examples. Such a distance can be adjusted between the camera and the stage to maximize the sharpness of the image of the edge of the stage. The distance between the edge of the stage 1404 and the camera 1402 can be equal to the working distance of the camera D1, 1430.

In some instances, as shown in FIGS. 13-14, the arm axis offset to the rotation stage center in X axis D can be D=D0–(D1+0.5*D2). The arm axis offset to the stage surface in Z axis vertical direction as shown in FIG. 15 can be performed by rotating the arm by 90 degrees from home position or using a second camera arrangement to the side of the stage, and capturing an image of the stage, and calculating the stage height relative to the image center H 1508=H0 1520–H1 1510.

Surface Reflection Capturing

In high clarity grading, surface reflection images may be useful. To capture such surface reflection images, a surface reflection capture process can be performed based on various facet types on different cut stones. For example, for a round brilliant cut (RBC) diamond, facet capture can be in the order of: (1) pavilion main, (2) lower girdle, (3) upper girdle, (4) bezel, and (5) star facets. In order to take such reflection images, a robotic arm may utilize calibration routines and position instruction to move around the stage and sample gemstone to capture surface reflection images for analysis and/or storage.

Before the surface reflection capture, a camera with robotic arm position can be at the home position, which may be perpendicular to the stage with the defined theta value 0. The arm can rotate in the XY plane around the axis A. Based on the facet information: rho, theta and phi, stone center and the calibrated axis A position, three steps can be required to be completed before capturing the image. (Note coordinate plane different in FIG. 16 than other figures.)

Figure 16:
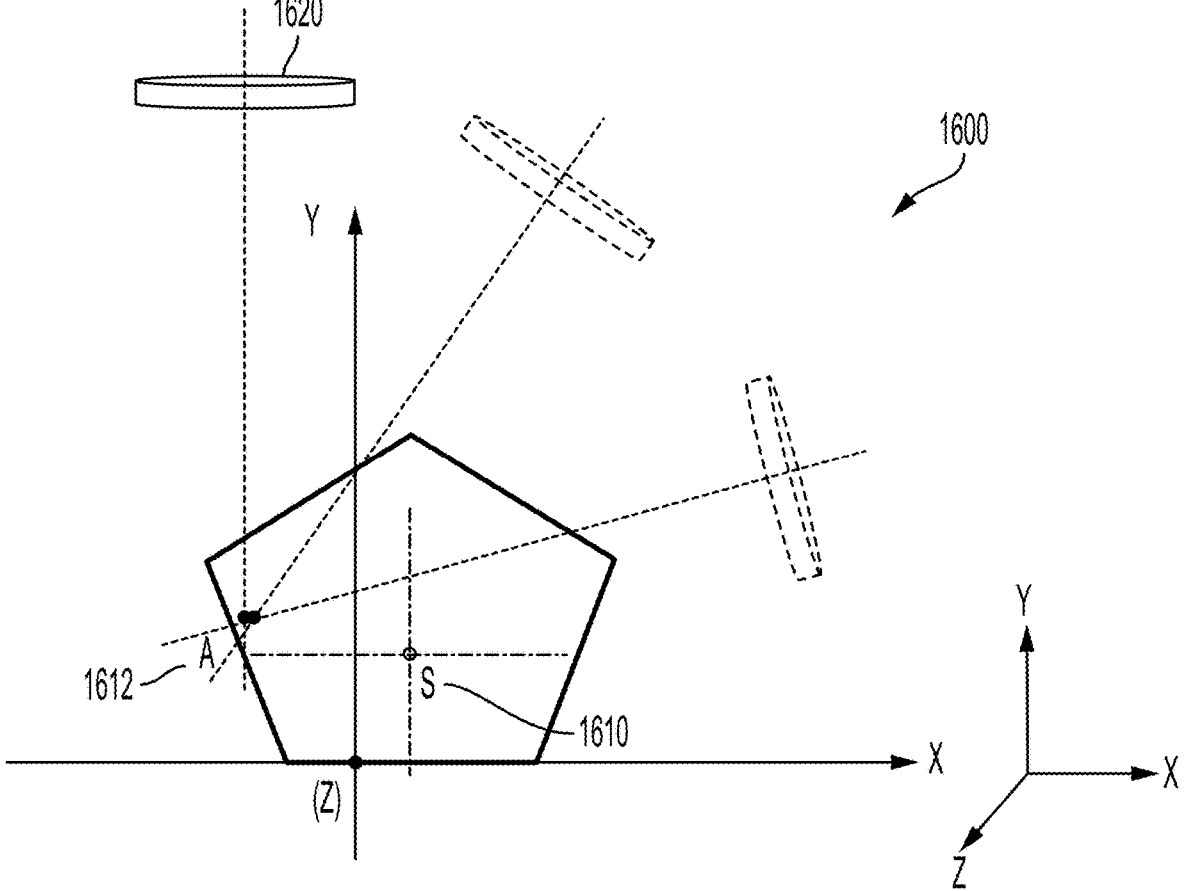
FIG. 16 is an example diagram of a coordinate plane for surface reflection capturing in accordance with certain aspects described herein.

FIG. 16 is an example diagram 1600 of a coordinate plane for surface reflection capturing. As shown in FIG. 16, S 1610 can specify a stone center, A 1612 can specify the camera arm 1620 rotation axis, which can be parallel to the Z axis.

As part of performing the surface reflection capture process, the stage can be rotated based on facet azimuth theta value and slope value phi. When the arm rotates from the pavilion side to the crown side, the angle between the lens and light projecting to the stage plane can change. A geometry chart describing the change of the angle can be specified as:

$$Theta = A\tan(Dx/Dz).$$

When the camera arm rotates, Dx (a distance between lens and light on the stage plane) can be the same, and Dz (distance lens to the rotation axis) can change according to the facet slope angle phi.

Figure 17:
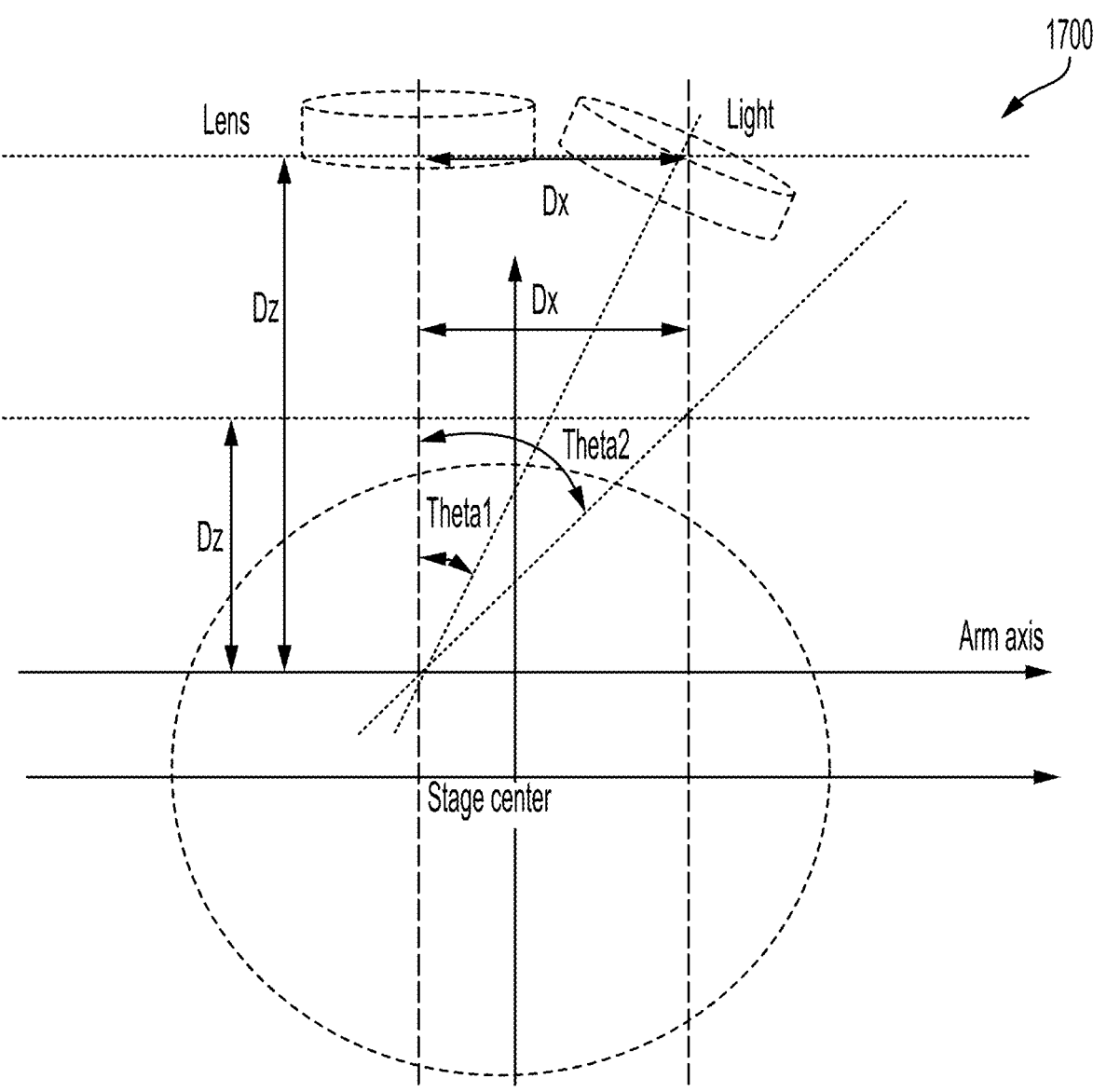
FIG. 17 is an example diagram of a coordinate plane for a rotating arm in accordance with certain aspects described herein.

FIG. 17 is an example diagram 1700 of a coordinate plane for a rotating camera arm which may be used in the systems and methods described herein to illuminate and/or capture images of gemstones. The surface reflection capture process can also include rotating the camera arm based on facet slope angle phi. Further, the surface reflection capture process can include focusing the camera based on the facet info rho, theta, phi, the stone center, and arm rotation axis position.

Figure 18:
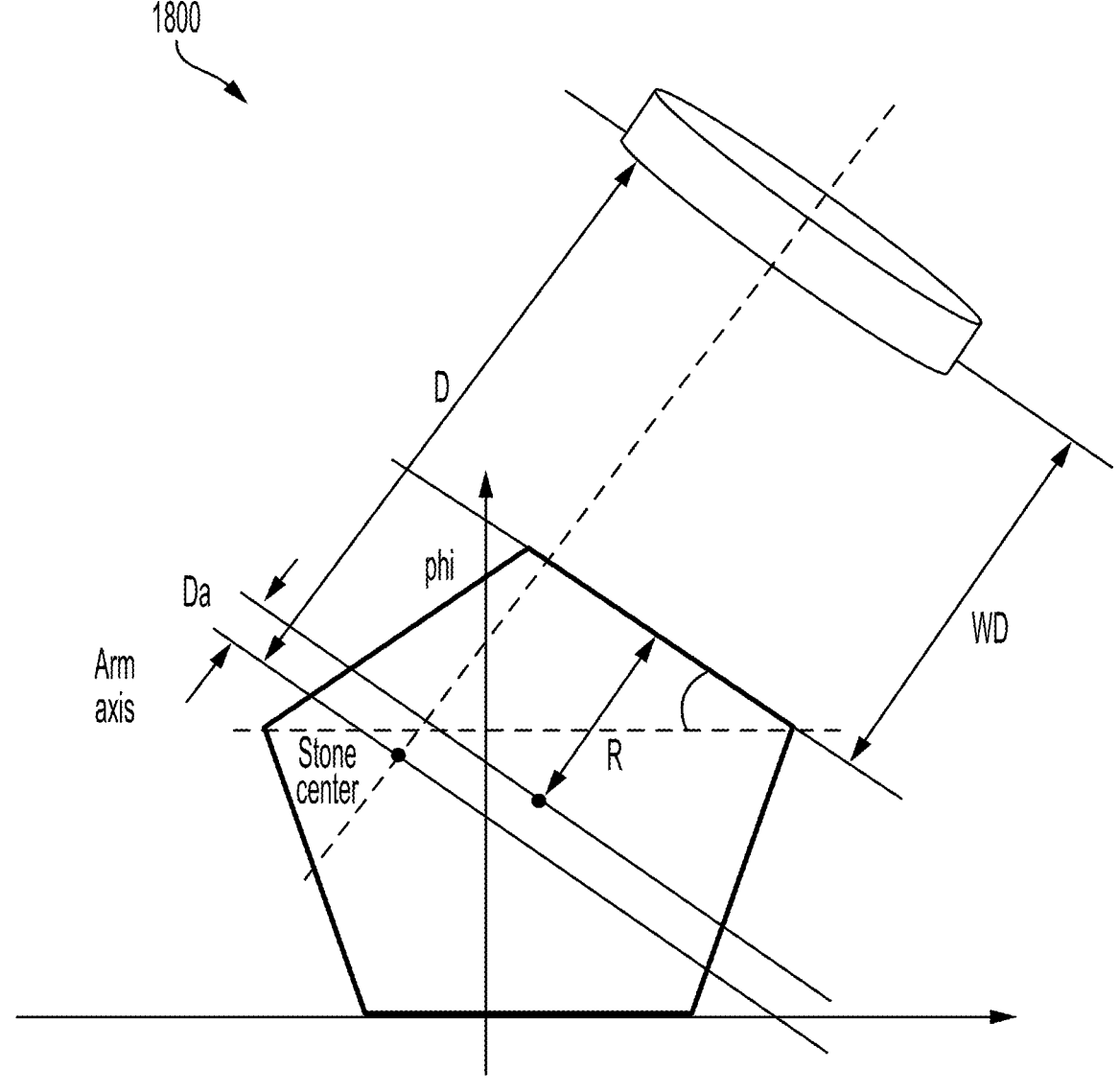
FIG. 18 is an example diagram of a focus adjustment based on wireframe in accordance with certain aspects described herein.

FIG. 18 is an example diagram 1800 of a focus adjustment based on a known or preloaded wireframe model of a gemstone. A camera lens distance to the arm rotation axis D=Da+R+WD, where Da is the adjusted distance, R is the distance rho from the stone center to the facet, and WD is the lens working distance. Based on the geometry relationship between the arm axis and the stone center, Da=Das*cos (theta), Das can be the distance between camera arm axis and the stone center, Theta=Theta1+Theta2; Theta1=90–phi, phi is the facet slope angle, Theta2 can be the slope angle of the line between arm axis and the stone center.

Figure 19:
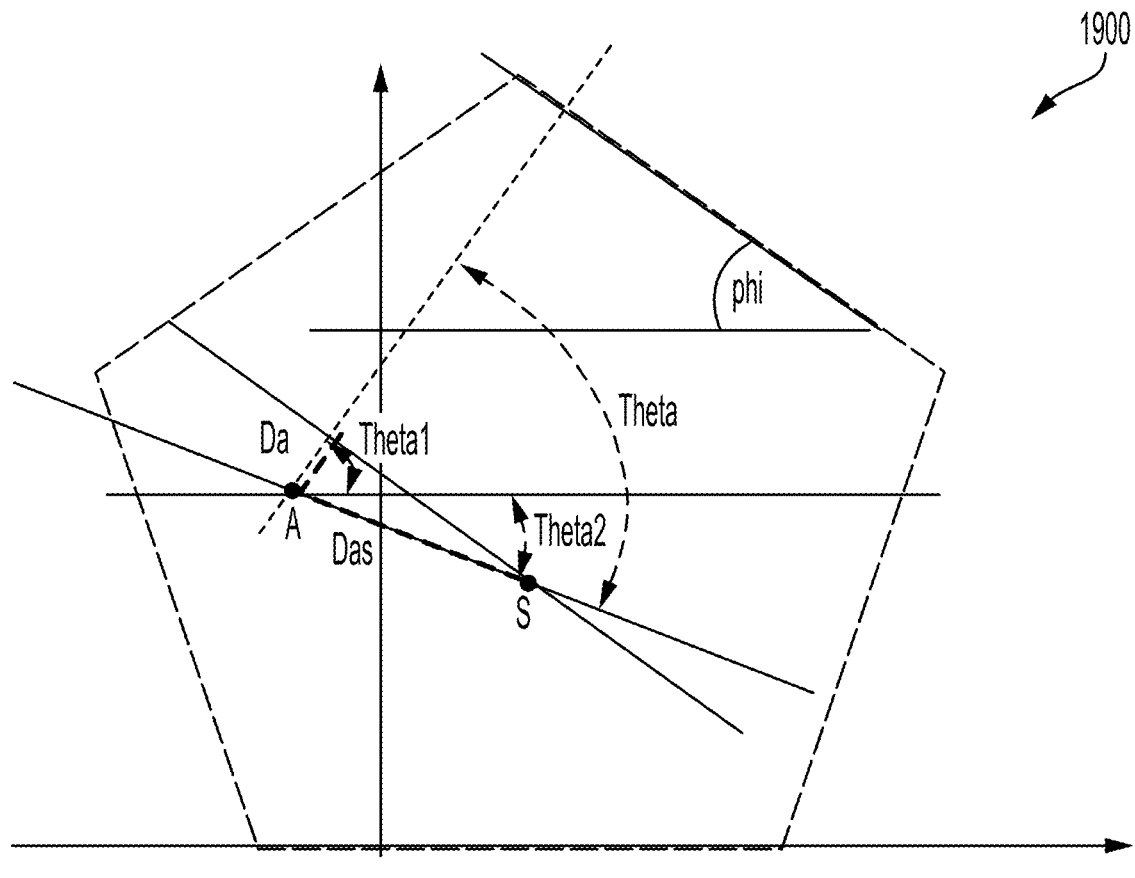
FIG. 19 is an example diagram of a geometry relationship of the wireframe in accordance with certain aspects described herein.

FIG. 19 is an example diagram 1900 of a geometry relationship of the wireframe. The surface reflection capture process can also include optimizing focusing by Z-scanning.

Figure 20:
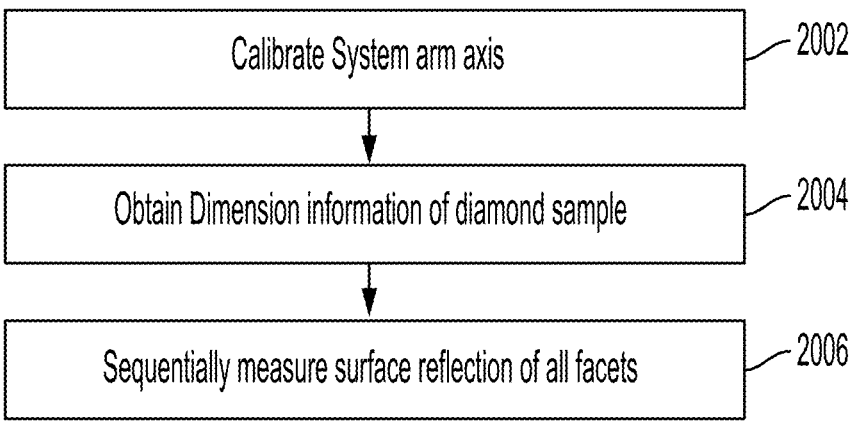
FIG. 20 is a flow process of an example workflow to convert gemstone dimension information into azimuth, slope, and distance information and adjust the motorized stage accordingly for surface imaging.

FIG. 20 is a flow process 2000 of an example workflow to convert gemstone dimension information into azimuth, slope, and distance information and adjust the motorized stage accordingly for surface imaging. At 2002, the process can include calibrating an arm axis of the system.

The arm axis calibration relies on the feedbacks from the silhouette images from camera 1206 and the images of the nozzle 1240 from the side camera 1202. First, a series of silhouette images of the stage nozzle were taken to confirm the top surface of the stage nozzle is flat during rotation of nozzle. Then adjust the side camera 1202 to image the stage nozzle. When the camera 1202 is perpendicular to the stage nozzle, the nozzle plane has the maximum area size.

At 2004, the process can include placing a gemstone sample on the stage to capture gemstone dimension information. This can include performing a dimension measurement using a silhouette imaging technique. This can also include loading dimension information from another measurement system. Further, 2 or 3 facets can be identified by scanning. The scanning can be based on the relative azimuth and slope difference to locate these facets. Based on the known facets, the offset can be calculated between the sample center to the stage rotation center. The known facets can be projected to the dimension data and estimate the other facets.

At 2006, the process can include sequentially measuring the surface reflection from all facets. This can include rotating the stage based on facet azimuth theta value and slope value phi. This can also include adjusting the angular offset based on the geometry. This can also include focusing the camera based on the facet info rho, theta, phi, the stone center and arm rotation axis position. This can also include any of applying an additional offset based on the geometry relationship, scanning the camera to optimize the focusing, and/or capturing the surface specular reflection image.

In an example embodiment, a method to convert gemstone dimension information into various information types and modifying a motorized stage for surface imaging is provided. In some instances, the method can include performing a calibration process on an axis of an arm connected to a camera, the axis of the arm being relative to the stage. In some instances, the calibration process is based at least on an offset between a target alignment and actual alignment of the arm.

The method can also include determining a set of dimension information of a gemstone on a stage. The set of dimension information can be determined based on a silhouette imaging process. Determining the set of dimension information can include obtaining the set of dimension information from a measurement system. In some instances, determining the set of dimension information can include calculating an offset between a center of the gemstone to a rotation center of the stage.

The method can also include identifying one or more facets of the gemstone using the set of dimension information. In some instances, identifying the one or more facets includes identifying two or three facets of the gemstone based on a relative azimuth and a slope difference.

The method can also include measuring a set of surface reflection data from each of the identified facets. In some instances, measuring the set of surface reflection data further includes rotating the stage based on a facet azimuth theta value and a slope value phi value.

In some instances, measuring the set of surface reflection data further includes adjusting an angular offset based on a defined geometry of the gemstone.

In some instances, measuring the set of surface reflection data further includes focusing a camera based any of a rho, a theta, a phi, a stone center, and am arm rotation axis position.

In some instances, measuring the set of surface reflection data further includes applying an additional offset based on a geometry relationship of the gemstone.

In some instances, measuring the set of surface reflection data further includes performing a scanning process to a camera to optimize a focusing of the camera.

In some instances, measuring the set of surface reflection data further includes capturing a surface specular reflection image of the gemsone.

The method can also include adjusting a position of the stage based on the set of surface reflection data for gemstone surface imaging.

In some instances, the method further comprises projecting each of the one or more facets to the set of dimension information to estimate a position of each other facet of the gemstone.

Network Examples

An example of a networked computing arrangement which may be utilized here is shown in FIG. 21. In FIG. 21, the computer 2102 used to process the image from the camera (142 in FIG. 1) may generate data which includes pixel data of the captured images. The computer 2102 could be any number of kinds of computers alone or in combination such as those included with the camera itself, the light source itself, and/or another computer arrangement in communication with the camera and/or light computer components and in some examples, the stage motors and/or camera lens motors, including but not limited to a laptop, desktop, tablet, phablet, smartphone, or any other kind of device used to process and transmit digitized data. Such a computer 2102 may be used to control a camera 2180 and/or light generating device 2190 as described herein. The computer 2102, additional or alternative examples are described in FIG. 8.

Turning back to FIG. 21, computer resources for any aspect of the system may reside in networked or distributed format over the network 2120. Further, the data captured for the pixelated image from whichever computer 2102 may be transmitted to a back end computer 2130 and associated data storage 2132 for saving and analysis. In some examples, the transmission may be wireless 2110 by a cellular or WiFi transmission with associated routers and hubs. In some examples, the transmission may be through a wired connection 2112. In some examples, the transmission may be through a network such as the internet 2120 to the back end server computer 2130 and associated data storage 2132. At the back end server computer 2130 and associated data storage 2132, the pixelated image data may be stored, analyzed, compared to previously stored image data for matching, or any other kind of image data analysis. In some examples, the storing, analyzing, and/or processing of image data may be accomplished at the computer 2102 which is involved in the original image capture. In some examples, the data storing, analyzing, and/or processing may be split between the local computer 2102 and a back end computing system 2130. Networked computer resources 2130 may allow for more data processing power to be utilized than may be otherwise available at the local computers 2102. In such a way, the processing and/or storage of image data may be offloaded to compute resources that are available on the network. In some examples, the networked computer resources 2130 may be virtual machines in a cloud infrastructure. In some examples, the networked computer resources 2130 may be spread across many multiple computer resources by a cloud infrastructure. The example of a single computer server 2130 is not intended to be limiting and is only one example of a compute resource that may be utilized by the systems and methods described herein.

Example Computer Devices

As described, any number of computing devices may be arranged into or connected with the various component parts of the systems described herein and/or to practice the methods described herein. For example, the camera systems may include their own computing systems, the lighting systems may include their own computing systems, the data from the camera images may be collected, stored and analyzed using computing systems. In some examples, some of the computing resources may be networked, or in communication over a network, such that they are not necessarily co-located with the optics systems described herein. In any case, any of the computing systems used here may include component parts such as those described in FIG. 22.

FIG. 22 shows an example computing device 2200 which may be used in the systems and methods described herein. In the example computer 2200 a CPU or processor 2210 is in communication by a bus or other communication 2212 with a user interface 2214. The user interface includes an example input device such as a keyboard, mouse, touchscreen, button, joystick, or other user input device(s). The user interface 2214 also includes a display device 2218 such as a screen. The computing device 2200 shown in FIG. 22 also includes a network interface 2220 which is in communication with the CPU 2220 and other components. The network interface 2220 may allow the computing device 2200 to communicate with other computers, databases, networks, user devices, or any other computing capable devices. In some examples, the method of communication may be through WiFi, cellular, Bluetooth Low Energy, wired communication, or any other kind of communication. In some examples, the example computing device 2200 includes peripherals 2224 also in communication with the processor 2210. In some examples, peripherals include antennae 2226 used for communication. In some examples peripherals 2224 may include camera equipment 2228. In some examples, computing device 2200 a memory 2222 is in communication with the processor 2210. In some examples, this memory 2222 may include instructions to execute software such as an operating system 2232, network communications module 2234, other instructions 2236, applications 2238, applications to digitize images 2240, applications to process image pixels 2242, data storage 2258, data such as data tables 2260, transaction logs 2262, sample data 2264, encryption data 2270 or any other kind of data.

CONCLUSION

As disclosed herein, consistent with the present embodiments may be implemented via computer-hardware, software and/or firmware. For example, the systems and methods disclosed herein may be embodied in various forms including, for example, a data processor, such as a computer that also includes a database, digital electronic circuitry, firmware, software, computer networks, servers, or in combinations of them. Further, while some of the disclosed implementations describe specific hardware components, systems and methods consistent with the innovations herein may be implemented with any combination of hardware, software and/or firmware. Moreover, the above-noted aspects and principles of the innovations herein may be implemented in various environments. Such environments and related applications may be specially constructed for performing the various routines, processes and/or operations according to the embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the embodiments, or it may be more convenient to construct a specialized apparatus or system to perform the required methods and techniques.

Aspects of the method and system described herein, such as the logic, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the descriptions have been specifically described herein, it will be apparent to those skilled in the art to which the descriptions pertains that variations and modifications of the various implementations shown and described herein may be made without departing from the spirit and scope of the embodiments. Accordingly, it is intended that the embodiments be limited only to the extent required by the applicable rules of law.

The present embodiments can be embodied in the form of methods and apparatus for practicing those methods. The present embodiments can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the embodiments. The present embodiments can also be in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the embodiments. When implemented on a general-purpose processor, the program code segments combine with the processor to provide a unique device that operates analogously to specific logic circuits.

The software is stored in a machine readable medium that may take many forms, including but not limited to, a tangible storage medium, a carrier wave medium or physical transmission medium. Non-volatile storage media include, for example, optical or magnetic disks, such as any of the storage devices in any computer(s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: disks (e.g., hard, floppy, flexible) or any other magnetic medium, a CD-ROM, DVD or DVD-ROM, any other optical medium, any other physical storage medium, a RAM, a PROM and EPROM, a FLASH-EPROM, any other memory chip, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles of the embodiments and its practical applications, to thereby enable others skilled in the art to best utilize the various embodiments with various modifications as are suited to the particular use contemplated.

What is claimed is:

1. A method, comprising, by a computer in communication with at least one light source and a digital camera, causing a light source to emit light to illuminate a sample diamond with diffused light by directing the emitted light through a diffuser, wherein the sample diamond comprises a diamond table facet and a number of diamond facets;

by the computer, causing the digital camera to capture a set of surface images of the diamond table facet under the diffused light;

by the computer, causing illumination of the number of diamond facets, other than the diamond table facet, with collimated light by directing the emitted light through a collimator;

by the computer, causing the digital camera to capture a set of surface images of the number of diamond facets, other than the diamond table facet, under the collimated light;

by the computer, causing illumination of the diamond table facet with dark field illumination;

by the computer, causing the digital camera to capture a set of internal images through the diamond table facet at a plurality of focal depths under the dark field illumination;

by the computer, causing the digital camera to capture a set of internal images through the number of diamond facets other than the diamond table facet, at a plurality of focal depths under the dark field illumination;

by the computer, processing the set of surface images of the diamond table facet, the set of surface images of the number of diamond facets, the set of internal images through the diamond table facet, and the set of internal images through the number of diamond facets to identify one or more clarity features from the diamond table facet or any facet of the sample diamond; and assigning a clarity grade for the sample diamond based on the one or more identified clarity features.

2. The method of claim 1 further comprising, by the computer, analyzing the captured surface digital images of the diamond table facet and surface digital images of the diamond facets other than the diamond table facet, to detect anomalies.

3. The method of claim 2 further comprising, by the computer, analyzing the captured internal digital images through the diamond table facet and through the diamond facets surfaces other than the diamond table facet, to detect anomalies.

4. The method of claim 1 wherein the plurality of internal images is taken at focal scanning steps of 0.3 mm.

5. The method of claim 1 wherein the captured digital camera images of the surface of the diamond facets other than the diamond table facet under collimated light include 56 surface images.

6. The method of claim 1 wherein the captured digital camera images of the internal images include 96 internal images with a focal scanning step for example but not limited to 0.25 mm or 0.3 mm.

7. The method of claim 1 further comprising, analyzing, by the computer, the surface images by localizing surface and surface reaching features from the surface images of each facet using boundary analysis or contrast comparison of pixels within each image;

identifying, by the computer, a type of surface and surface reaching features in the images wherein a type includes a feather, pit, scratch, polish lines, surface graining, or burns;

classifying, by the computer, a degree of surface and surface reaching features based on a size and a contrast of the surface features by comparing a detected inclusion size and contrast to a threshold value previously determined;

analyzing, by the computer, the internal images by localizing internal and surface reaching internal features from the captured internal digital images from different azimuth angles and depths;

identifying, by the computer, a type of internal and surface reaching internal features, wherein a type includes a feather, pinpoint, cloud, or internal graining;

differentiating, by the computer, internal inclusions using the surface analysis;

classifying, by the computer, a degree of internal and surface reaching internal features based on size and contrast of the internal features using pixel counting and contrast; and generating, by the computer, the clarity grade using the surface and internal analyses.

8. A system, comprising, a computer with a processor and a memory, in communication with at least one light source and a digital camera, the computer configured to cause the at least one light source to illuminate a sample diamond, wherein the sample diamond is configured on a stage and comprises a diamond table facet and a number of diamond facets, the computer configured to cause the at least one light source to emit light to illuminate a sample diamond table facet with diffused light by directing the emitted light through a diffuser, cause the digital camera to capture surface images of the diamond table facet under the diffused light, cause illumination of the number of diamond facets, other than the diamond table facet, with collimated light by directing the emitted light through a collimator, cause the digital camera to capture surface images of the number of diamond facets, other than the diamond table facet under the collimated light, cause illumination of the diamond table facet with dark field illumination, cause the digital camera to capture internal images through the diamond table facet at a plurality of focal depths under the dark field illumination, and cause the digital camera to capture internal images through the number of diamond facets, other than the diamond table facet, at a plurality of focal depths under the dark field illumination, process the set of surface images of the diamond table facet, the set of surface images of the number of diamond facets, the set of internal images through the diamond table facet, and the set of internal images of through the number of diamond facets to identify one or more clarity features from the diamond table facet or any facet of the sample diamond, and assign a clarity grade for the sample diamond based on the one or more identified clarity features.

9. The system of claim 8 wherein the system further includes a stage motor configured to rotate the stage, a slope motor configured to adjust slope of the digital camera to the stage, and a focus adjustment motor configured to adjust focus of the digital camera to the stage.

10. The system of claim 9 wherein the system further includes a back silhouette light source and a silhouette camera configured to capture a plurality of digital silhouette images of the sample diamond on the rotating stage.

11. The system of claim 8 wherein the computer is further configured to analyze the surface images by localizing surface and surface reaching features from the surface images of each facet using boundary analysis or contrast comparison of pixels within each image;

identify a type of surface and surface reaching features in the images wherein a type includes a feather, pit, scratch, polish lines, surface graining, or burns;

classify a degree of surface and surface reaching features based on a size and a contrast of the surface features by comparing a detected inclusion size and contrast to a threshold value previously determined;

analyze the internal images by localizing internal and surface reaching internal features from the captured internal digital images from different azimuth angles and depths;

identify a type of internal and surface reaching internal features, wherein a type includes a feather, pinpoint, cloud, or internal graining;

differentiate internal inclusions using the surface analysis;

classify a degree of internal and surface reaching internal features based on size and contrast of the internal features using pixel counting and contrast; and generate the clarity grade using the surface and internal analyses.

* * * * *